US010992546B2

(12) United States Patent
Mereddy

(10) Patent No.: US 10,992,546 B2
(45) Date of Patent: Apr. 27, 2021

(54) MULTI-DOMAIN SOFTWARE DEFINED NETWORK CONTROLLER

(71) Applicant: Charter Communications Operating, LLC, St. Louis, MO (US)

(72) Inventor: Sandeep Reddy Mereddy, Aurora, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 0 days.

(21) Appl. No.: 16/506,590

(22) Filed: Jul. 9, 2019

(65) Prior Publication Data

US 2021/0014128 A1 Jan. 14, 2021

(51) Int. Cl.
*H04L 12/26* (2006.01)
*G06F 11/22* (2006.01)
*H04L 12/24* (2006.01)
*H04L 29/06* (2006.01)
*H04L 12/801* (2013.01)

(52) U.S. Cl.
CPC .......... *H04L 41/22* (2013.01); *H04L 41/0213* (2013.01); *H04L 41/069* (2013.01); *H04L 41/12* (2013.01); *H04L 47/196* (2013.01); *H04L 63/02* (2013.01)

(58) Field of Classification Search
CPC ....... H04L 41/22; H04L 41/069; H04L 63/02; H04L 41/0213; H04L 47/196; H04L 41/12
See application file for complete search history.

(56) References Cited

U.S. PATENT DOCUMENTS

| 6,757,727 | B1 * | 6/2004 | Ivory | ..................... H04L 41/02 370/242 |
|---|---|---|---|---|
| 7,792,963 | B2 | 9/2010 | Gould et al. | |
| 8,842,578 | B1 * | 9/2014 | Zisapel | ................ H04L 43/045 370/255 |
| 2003/0056217 | A1 | 3/2003 | Brooks | |
| 2006/0130107 | A1 | 6/2006 | Gonder et al. | |
| 2007/0217436 | A1 | 9/2007 | Markley et al. | |
| 2009/0248794 | A1 | 10/2009 | Helms et al. | |
| 2010/0313236 | A1 | 12/2010 | Straub | |

(Continued)

OTHER PUBLICATIONS

Wikipedia, OSI model, downloaded May 15, 2019 from https://en.wikipedia.org/wiki/OSI_model, pp. 1-4.

*Primary Examiner* — Nicholas R Taylor
*Assistant Examiner* — Sanjoy Roy
(74) *Attorney, Agent, or Firm* — Otterstedt, Wallace & Kammer, LLP

(57) ABSTRACT

A method and system for diagnosing a fault in a system. Operational state and configuration information is obtained from a plurality of components residing in a plurality of domains, the status and configuration information being based on a plurality of layers of a communication model. The operational state and configuration information are correlated and reformatted to create an end-to-end view of a network-based application; and a user interface configured to visualize the correlated and reformatted operational state and configuration information across the plurality of domains is generated, the user interface configured to present the visualized status and configuration information at each of the plurality of layers.

16 Claims, 16 Drawing Sheets

(56) References Cited

U.S. PATENT DOCUMENTS

| | | | |
|---|---|---|---|
| 2011/0122866 A1* | 5/2011 | Vasamsetti | H04L 43/0817 370/352 |
| 2013/0111374 A1* | 5/2013 | Hamilton | H04L 41/22 715/763 |
| 2016/0036636 A1* | 2/2016 | Erickson | H04L 41/145 370/248 |
| 2016/0182344 A1* | 6/2016 | Subhedar | H04L 41/16 370/241.1 |
| 2017/0201323 A1* | 7/2017 | Prakash | H04Q 11/0001 |

* cited by examiner

Level 5
1144-1

Console logging: disabled
Monitor logging: level debugging, 0 messages logged
Trap logging: level informational, 6899 messages logged
Logging to \*\*\*.\*\*.\*\*\*.\*\*, 6899 message lines logged
Buffer logging: level informational, 17562 messages logged Level 5
1144-2

Console logging: disabled
Monitor logging: level debugging, 0 messages logged
Trap logging: level informational, 6899 messages logged
Logging to \*\*\*.\*\*.\*\*\*.\*\*, 6899 message lines logged
Buffer logging: level informational, 17562 messages logged

*FIG. 11C*

MULTI-DOMAIN SOFTWARE DEFINED NETWORK CONTROLLER

FIELD OF THE INVENTION

The present invention relates generally to the electrical, electronic, and computer arts, and more particularly relates to a multi-domain software defined network (SDN) controller.

BACKGROUND OF THE INVENTION

Historically, the cable network was predominantly a vehicle for delivering entertainment. With the advent of the Internet and the rise in demand for broadband two-way access, the cable industry began to seek new ways of utilizing its existing plant. Pure coaxial ("coax") cable networks were replaced with hybrid fiber/coax networks (HFCs) using optical fiber from the head end to the demarcation with the subscriber coax (usually at a fiber node). Currently, a content-based network, a non-limiting example of which is a cable television network, may afford access to a variety of services besides television, for example, broadband Internet access, telephone service, and the like. There are also fiber networks for fiber to the home (FTTH) deployments (also known as fiber to the premises or FTTP), where the CPE is a Service ONU (S-ONU; ONU=optical network unit).

One significant issue for a cable operator desiring to provide digital service is the configuration of its network. Designed for one-way delivery of broadcast signals, the existing cable network topology was optimized for downstream only (i.e., towards the subscriber) service. New equipment had to be added to the network to provide two-way communication. To reduce the cost of this equipment and to simplify the upgrade of the broadcast cable for two-way digital traffic, standards were developed for a variety of new cable-based services. The first of these standards, the Data Over Cable System Interface Standard (DOCSIS® standard), was released in 1998. DOCSIS® establishes standards for cable modems and supporting equipment. DOCSIS® (Data Over Cable Service Interface Specification) is a registered mark of Cable Television Laboratories, Inc., 400 Centennial Parkway Louisville Colo. 80027, USA, and may be referred to at some points herein in capital letters, without the ® symbol, for convenience.

There are many types of IP networks besides cable networks. Other wired IP networks include, for example, digital subscriber line (DSL), fiber to the home, fiber to the curb, and so on. Wireless IP networks include Wi-Fi, wireless ISP (Internet Service Provider), WiMAX, satellite internet, and mobile broadband.

Provisioning, within a broadband network, includes the process of ensuring that customer premises equipment (CPE) such as cable modems, digital subscriber line (DSL) modems, and the like are properly configured, authenticated, and successfully come online. Failures may occur from time-to-time in providing services to, for example, customer premises. Diagnosing such failures and quickly restoring a service is a key goal of service providers.

SUMMARY OF THE INVENTION

Techniques are provided for monitoring a system using a multi-domain software defined network (SDN) controller.

In one aspect, an exemplary method includes operations comprising obtaining operational state and configuration information from a plurality of components residing in a plurality of domains, the status and configuration information based on a plurality of layers of a communication model; correlating and reformatting the operational state and configuration information to create an end-to-end view of a network-based application; and generating a user interface configured to visualize the correlated and reformatted operational state and configuration information across the plurality of domains, the user interface configured to present the visualized status and configuration information at each of the plurality of layers.

In one aspect, an apparatus comprises a memory; and at least one processor, coupled to said memory, and operative to perform operations comprising: obtaining operational state and configuration information from a plurality of components residing in a plurality of domains, the status and configuration information based on a plurality of layers of a communication model; correlating and reformatting the operational state and configuration information to create an end-to-end view of a network-based application; and generating a user interface configured to visualize the correlated and reformatted operational state and configuration information across the plurality of domains, the user interface configured to present the visualized status and configuration information at each of the plurality of layers.

In another aspect, a non-transitory computer readable medium comprises computer executable instructions which when executed by a computer cause the computer to perform operations comprising: obtaining operational state and configuration information from a plurality of components residing in a plurality of domains, the status and configuration information based on a plurality of layers of a communication model; correlating and reformatting the operational state and configuration information to create an end-to-end view of a network-based application; and generating a user interface configured to visualize the correlated and reformatted operational state and configuration information across the plurality of domains, the user interface configured to present the visualized status and configuration information at each of the plurality of layers.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a machine readable medium that contains one or more programs which when executed implement one or more method steps set forth herein; that is to say, a computer program product including a tangible computer readable recordable storage medium (or multiple such media) with computer usable program code for performing the method steps indicated. Furthermore, one or more embodiments of the invention or elements thereof can be implemented in the form of an apparatus (e.g., an SDN controller) including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software and/or firmware module(s) stored in a tangible computer-readable recordable storage medium (or multiple such media) and implemented on a hardware processor, or (iii) a combination of (i) and (ii); any of (i)-(iii) implement the specific techniques set forth herein. The means do not include a transmission medium per se or a disembodied signal per se.

Techniques of the present invention can provide substantial beneficial technical effects. For example, one or more embodiments provide:

end-to-end diagnostic and troubleshooting capabilities;
improved user interface for facilitating system diagnostics and troubleshooting by a network operator;
a software defined network controller configurable as a stand-alone server to maintain diagnostic facilities in the event of a localized system failure;
and
visualization of applications and services over multi-domains and multi-layers.

These and other features and advantages of the present invention will become apparent from the following detailed description of illustrative embodiments thereof, which is to be read in connection with the accompanying drawings.

BRIEF DESCRIPTION OF THE DRAWINGS

FIGS. 11A, 11B, and 11C (collectively, FIG. 11) are an illustration of the relationship between different windows of an example graphical user interface for displaying status and configuration information for an end-to-end application and/or service over multiple layers of multiple domains of a system, in accordance with an example embodiment;

DETAILED DESCRIPTION OF PREFERRED EMBODIMENTS

Figure 1:
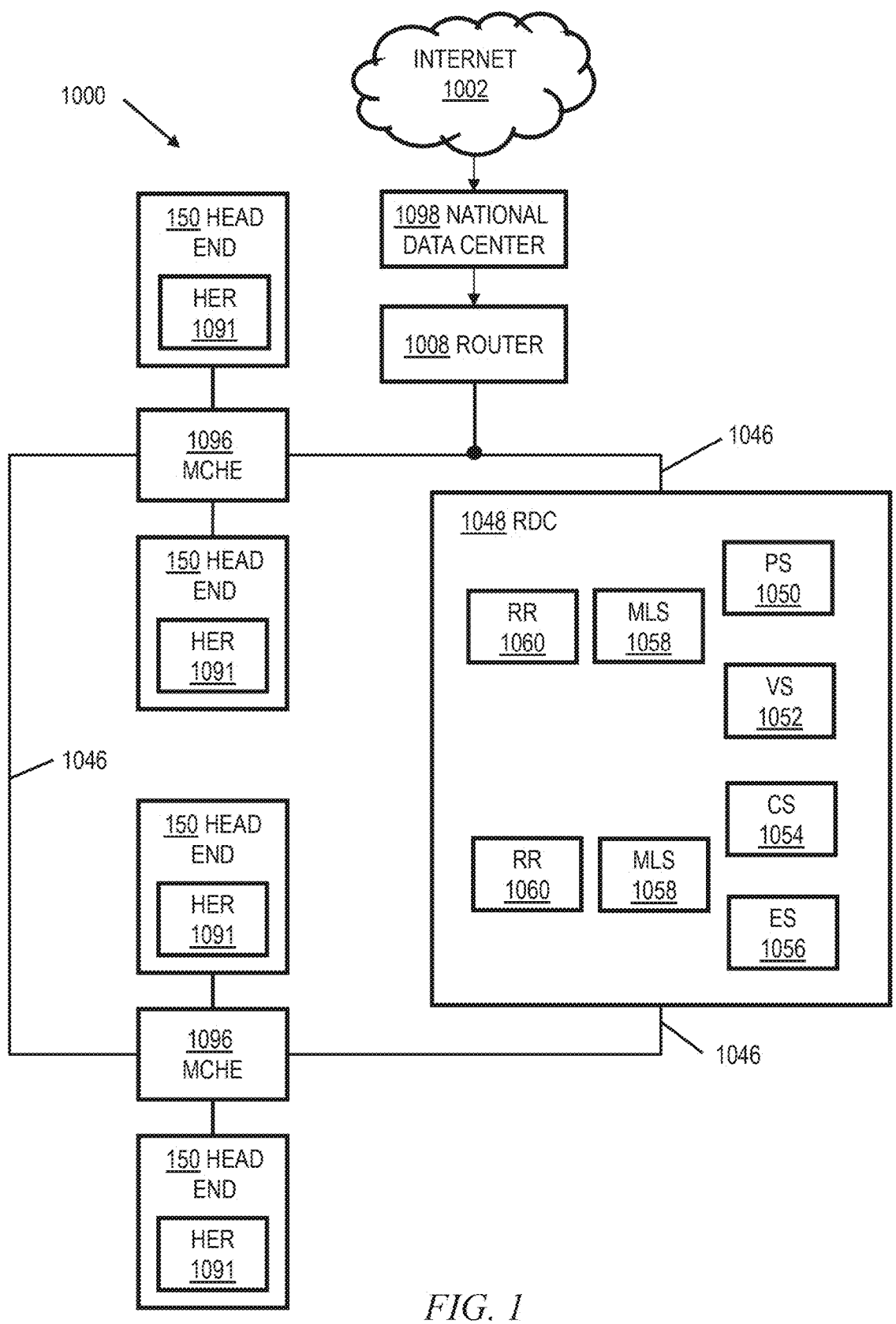
FIG. 1 is a block diagram of an exemplary embodiment of a system, within which one or more aspects of the invention can be implemented.

As noted, IP-based data services may be provided over a variety of networks. Purely by way of example and not limitation, some embodiments will be shown in the context of a cable multi-service operator (MSO) providing data services as well as entertainment services. FIG. 1 shows an exemplary system 1000, according to an aspect of the invention. System 1000 includes a regional data center (RDC) 1048 coupled to several Market Center Head Ends (MCHEs) 1096; each MCHE 1096 is in turn coupled to one or more divisions, represented by division head ends 150. In a non-limiting example, the MCHEs are coupled to the RDC 1048 via a network of switches and routers. One suitable example of network 1046 is a dense wavelength division multiplex (DWDM) network. The MCHEs can be employed, for example, for large metropolitan area. In addition, the MCHE is connected to localized HEs 150 via high-speed routers 1091 ("HER"=head end router) and a suitable network, which could, for example, also utilize DWDM technology. Elements 1048, 1096 on network 1046 may be operated, for example, by or on behalf of a cable MSO, and may be interconnected with a global system of interconnected computer networks that use the standardized Internet Protocol Suite (TCP/IP)(transfer control protocol/Internet protocol), commonly called the Internet 1002; for example, via router 1008. In one or more non-limiting exemplary embodiments, router 1008 is a point-of-presence ("POP") router; for example, of the kind available from Juniper Networks, Inc., Sunnyvale, Calif., USA.

Head end routers 1091 are omitted from figures below to avoid clutter, and not all switches, routers, etc. associated with network 1046 are shown, also to avoid clutter.

RDC 1048 may include one or more provisioning servers (PS) 1050, one or more Video Servers (VS) 1052, one or more content servers (CS) 1054, and one or more e-mail servers (ES) 1056. The same may be interconnected to one or more RDC routers (RR) 1060 by one or more multi-layer switches (MLS) 1058. RDC routers 1060 interconnect with network 1046.

A national data center (NDC) 1098 is provided in some instances; for example, between router 1008 and Internet 1002. In one or more embodiments, such an NDC may consolidate at least some functionality from head ends (local and/or market center) and/or regional data centers. For example, such an NDC might include one or more VOD servers; switched digital video (SDV) functionality; gateways to obtain content (e.g., program content) from various sources including cable feeds and/or satellite; and so on.

In some cases, there may be more than one national data center 1098 (e.g., two) to provide redundancy. There can be multiple regional data centers 1048. In some cases, MCHEs could be omitted and the local head ends 150 coupled directly to the RDC 1048.

Figure 2:
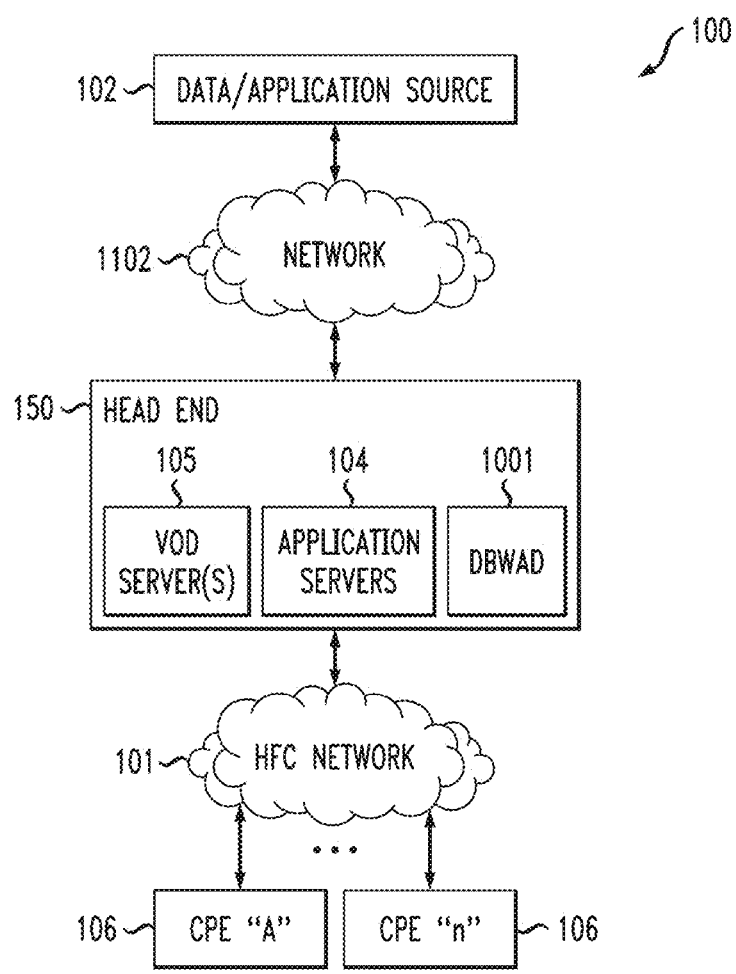
FIG. 2 is a functional block diagram illustrating an exemplary hybrid fiber-coaxial (HFC) divisional network configuration, useful within the system of FIG. 1.

FIG. 2 is a functional block diagram illustrating an exemplary content-based (e.g., hybrid fiber-coaxial (HFC)) divisional network configuration, useful within the system of FIG. 1. See, for example, US Patent Publication 2006/0130107 of Gonder et al., entitled "Method and apparatus for high bandwidth data transmission in content-based networks," the complete disclosure of which is expressly incorporated by reference herein in its entirety for all purposes. The various components of the network 100 include (i) one or more data and application origination points 102; (ii) one or more application distribution servers 104; (iii) one or more video-on-demand (VOD) servers 105, and (v) consumer premises equipment or customer premises equipment (CPE). The distribution server(s) 104, VOD servers 105 and CPE(s) 106 are connected via a bearer (e.g., HFC) network 101. Servers 104, 105 can be located in head end 150. A simple architecture is shown in FIG. 2 for illustrative brevity, although it will be recognized that comparable architectures with multiple origination points, distribution servers, VOD servers, and/or CPE devices (as well as different network topologies) may be utilized consistent with embodiments of the invention. For example, the head-end architecture of FIG. 3 (described in greater detail below) may be used.

It should be noted that the exemplary CPE 106 is an integrated solution including a cable modem (e.g., DOCSIS) and one or more wireless routers. Other embodiments could employ a two-box solution; i.e., separate cable modem and routers suitably interconnected, which nevertheless, when interconnected, can provide equivalent functionality. Furthermore, FTTH networks can employ S-ONUs as CPE, as discussed elsewhere herein.

The data/application origination point 102 comprises any medium that allows data and/or applications (such as a VOD-based or "Watch TV" application) to be transferred to a distribution server 104, for example, over network 1102. This can include for example a third party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill, given the teachings herein. For example, in one or more embodiments, network 1102 may correspond to network 1046 of FIG. 1, and the data and application origination point may be, for example, within NDC 1098, RDC 1048, or on the Internet 1002. Head end 150, HFC network 101, and CPEs 106 thus represent the divisions which were represented by division head ends 150 in FIG. 1.

The application distribution server 104 comprises a computer system where such applications can enter the network system. Distribution servers per se are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other appropriate locations) that can be accessed by the relevant upstream network components. Non-limiting examples of relevant upstream network components, in the context of the HFC network, include a distribution server 104 or a cable modem termination system 156 (discussed below with regard to FIG. 3). The skilled artisan will be familiar with other relevant upstream network components for other kinds of networks (e.g. FTTH) as discussed herein. Non-limiting examples of CPE are set-top boxes, high-speed cable modems, and Advanced Wireless Gateways (AWGs) for providing high bandwidth Internet access in premises such as homes and businesses. Reference is also made to the discussion of an exemplary FTTH network in connection with FIGS. 8 and 9.

Also included (for example, in head end 150) is a dynamic bandwidth allocation device (DBWAD) 1001 such as a global session resource manager, which is itself a non-limiting example of a session resource manager.

Figure 3:
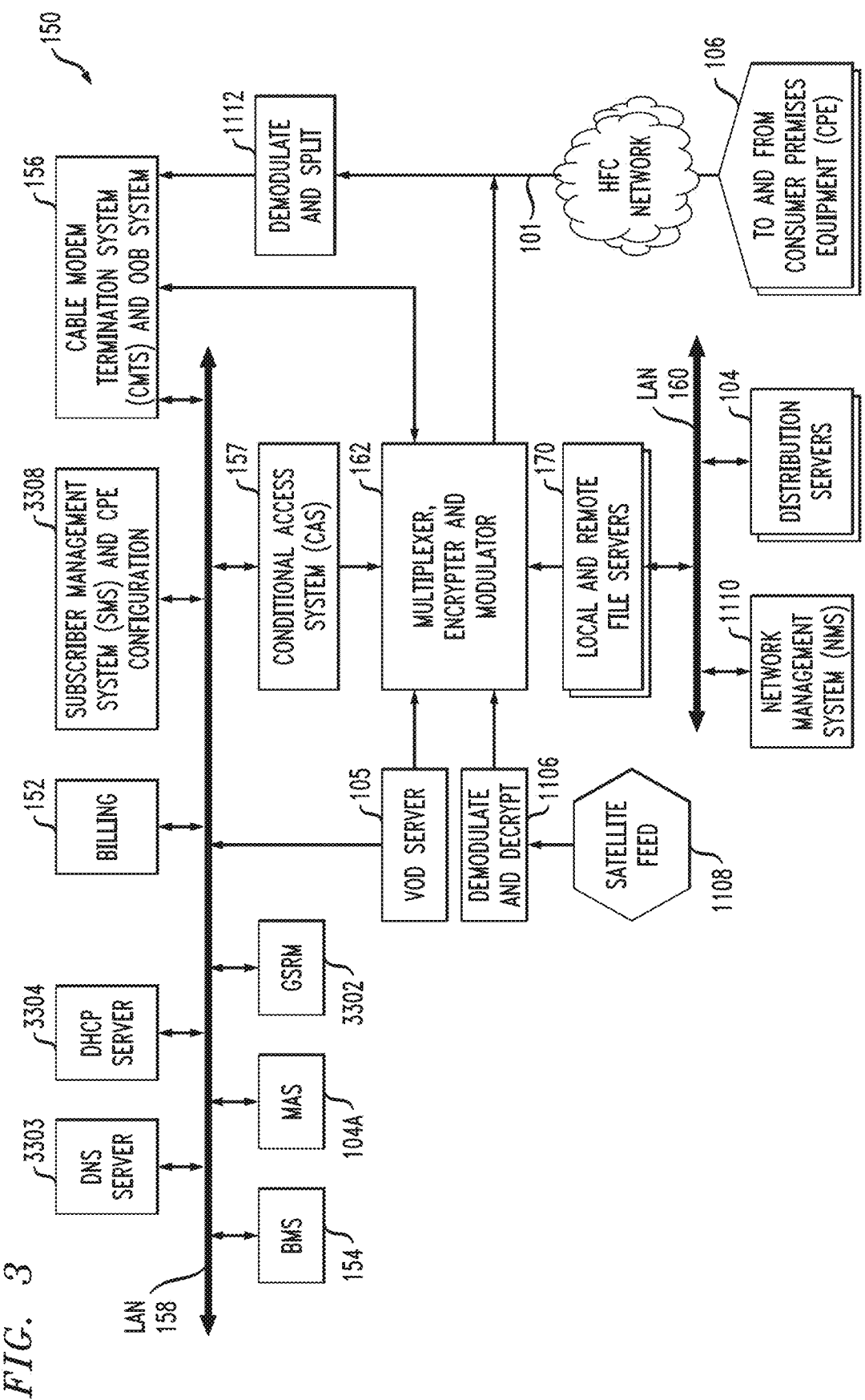
FIG. 3 is a functional block diagram illustrating one exemplary HFC cable network head-end configuration, useful within the system of FIG. 1.

FIG. 3 is a functional block diagram illustrating one exemplary HFC cable network head-end configuration, useful within the system of FIG. 1. As shown in FIG. 3, the head-end architecture 150 comprises typical head-end components and services including billing module 152, subscriber management system (SMS) and CPE configuration management module 3308, cable-modem termination system (CMTS) and out-of-band (OOB) system 156, as well as LAN(s) 158, 160 placing the various components in data communication with one another. In one or more embodiments, there are multiple CMTSs. Each may be coupled to an HER 1091, for example. See, e.g., FIGS. 1 and 2 of co-assigned U.S. Pat. No. 7,792,963 of inventors Gould and Danforth, entitled METHOD TO BLOCK UNAUTHORIZED NETWORK TRAFFIC IN A CABLE DATA NETWORK, the complete disclosure of which is expressly incorporated herein by reference in its entirety for all purposes.

It will be appreciated that while a bar or bus LAN topology is illustrated, any number of other arrangements (e.g., ring, star, etc.) may be used consistent with the invention. It will also be appreciated that the head-end configuration depicted in FIG. 3 is high-level, conceptual architecture and that each multi-service operator (MSO) may have multiple head-ends deployed using custom architectures.

The architecture 150 of FIG. 3 further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 158, although other architectures may be employed (such as for example where the VOD servers are associated with a core switching device such as an 802.3z Gigabit Ethernet device; or the VOD servers could be coupled to LAN 160). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (refer to description of FIG. 4) via a variety of interposed network components.

Content (e.g., audio, video, etc.) is provided in each downstream (in-band) channel associated with the relevant service group. (Note that in the context of data communications, internet data is passed both downstream and upstream.) To communicate with the head-end or intermediary node (e.g., hub server), the CPE 106 may use the out-of-band (OOB) or DOCSIS® (Data Over Cable Service Interface Specification) channels (registered mark of Cable Television Laboratories, Inc., 400 Centennial Parkway Louisville Colo. 80027, USA) and associated protocols (e.g., DOCSIS 1.x, 2.0, 3.0, or 3.1). The OpenCable™ Application Platform (OCAP) 1.0, 1.3.1, 2.0, 3.0 (and subsequent) specification (Cable Television laboratories Inc.) provides for exemplary networking protocols both downstream and upstream, although the invention is in no way limited to these approaches. All versions of the DOCSIS and OCAP specifications are expressly incorporated herein by reference in their entireties for all purposes.

Furthermore in this regard, DOCSIS is an international telecommunications standard that permits the addition of high-speed data transfer to an existing cable TV (CATV) system. It is employed by many cable television operators to provide Internet access (cable Internet) over their existing hybrid fiber-coaxial (HFC) infrastructure. Use of DOCSIS to transmit data on an HFC system is one non-limiting exemplary application context for one or more embodiments. However, one or more embodiments are generally applicable to IP transport of data, regardless of what kind of functionality is employed. It is also worth noting that the use of DOCSIS Provisioning of EPON (Ethernet over Passive Optical Network) or "DPoE" (Specifications available from CableLabs, Louisville, Colo., USA) enables the transmission of high-speed data over PONs using DOCSIS back-office systems and processes.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Also included in FIG. 3 are a global session resource manager (GSRM) 3302, a Mystro Application Server 104A, and a business management system 154, all of which are coupled to LAN 158. GSRM 3302 is one specific form of a DBWAD 1001 and is a non-limiting example of a session resource manager.

An ISP DNS server could be located in the head-end as shown at 3303, but it can also be located in a variety of other places. One or more Dynamic Host Configuration Protocol (DHCP) server(s) 3304 can also be located where shown or in different locations.

Figure 4:
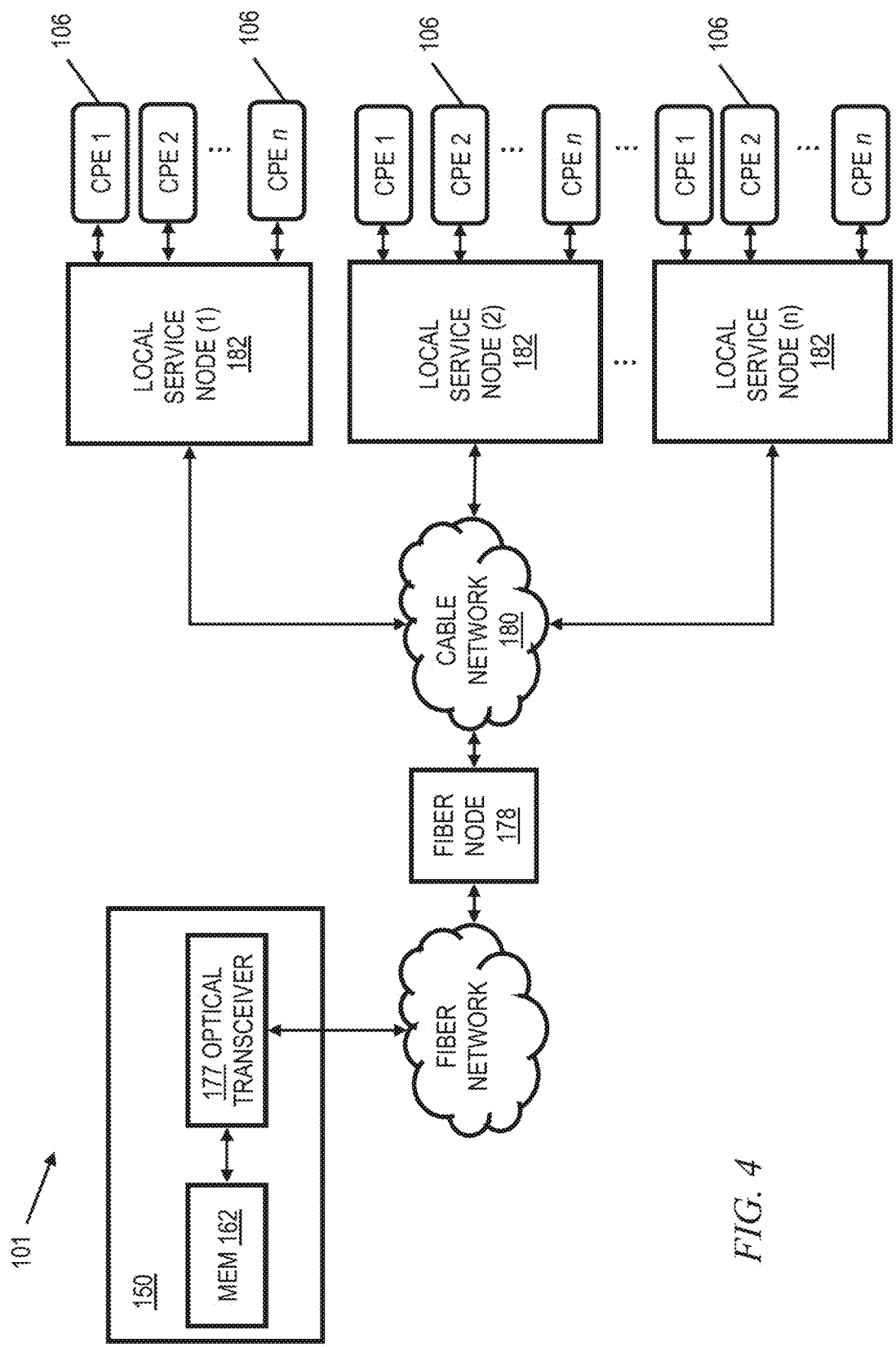
FIG. 4 is a functional block diagram illustrating one exemplary local service node configuration useful within the system of FIG. 1.

As shown in FIG. 4, the network 101 of FIGS. 2 and 3 comprises a fiber/coax arrangement wherein the output of the MEM 162 of FIG. 3 is transferred to the optical domain (such as via an optical transceiver 177 at the head-end 150 or further downstream). The optical domain signals are then distributed over a fiber network to a fiber node 178, which further distributes the signals over a distribution network 180 (typically coax) to a plurality of local servicing nodes 182. This provides an effective 1-to-N expansion of the network at the local service end. Each node 182 services a number of CPEs 106. Further reference may be had to US Patent Publication 2007/0217436 of Markley et al., entitled "Methods and apparatus for centralized content and data delivery," the complete disclosure of which is expressly incorporated herein by reference in its entirety for all purposes. In one or more embodiments, the CPE 106 includes a cable modem, such as a DOCSIS-compliant cable modem (DCCM). Please note that the number n of CPE 106 per node 182 may be different than the number n of nodes 182, and that different nodes may service different numbers n of CPE.

Certain additional aspects of video or other content delivery will now be discussed for completeness, it being understood that embodiments of the invention have broad applicability to TCP/IP network connectivity for delivery of messages and/or content. Again, delivery of data over a video (or other) content network is but one non-limiting example of a context where one or more embodiments could be implemented. US Patent Publication 2003-0056217 of Paul D. Brooks, entitled "Technique for Effectively Providing Program Material in a Cable Television System," the complete disclosure of which is expressly incorporated herein by reference for all purposes, describes one exemplary broadcast switched digital architecture, although it will be recognized by those of ordinary skill that other approaches and architectures may be substituted. In a cable television system in accordance with the Brooks invention, program materials are made available to subscribers in a neighborhood on an as-needed basis. Specifically, when a subscriber at a set-top terminal selects a program channel to watch, the selection request is transmitted to a head end of the system. In response to such a request, a controller in the head end determines whether the material of the selected program channel has been made available to the neighborhood. If it has been made available, the controller identifies to the set-top terminal the carrier which is carrying the requested program material, and to which the set-top terminal tunes to obtain the requested program material. Otherwise, the controller assigns an unused carrier to carry the requested program material, and informs the set-top terminal of the identity of the newly assigned carrier. The controller also retires those carriers assigned for the program channels which are no longer watched by the subscribers in the neighborhood. Note that reference is made herein, for brevity, to features of the "Brooks invention"—it should be understood that no inference should be drawn that such features are necessarily present in all claimed embodiments of Brooks. The Brooks invention is directed to a technique for utilizing limited network bandwidth to distribute program materials to subscribers in a community access television (CATV) system. In accordance with the Brooks invention, the CATV system makes available to subscribers selected program channels, as opposed to all of the program channels furnished by the system as in prior art. In the Brooks CATV system, the program channels are provided on an as needed basis, and are selected to serve the subscribers in the same neighborhood requesting those channels.

US Patent Publication 2010-0313236 of Albert Straub, entitled "TECHNIQUES FOR UPGRADING SOFTWARE IN A VIDEO CONTENT NETWORK," the complete disclosure of which is expressly incorporated herein by reference for all purposes, provides additional details on the aforementioned dynamic bandwidth allocation device 1001.

US Patent Publication 2009-0248794 of William L. Helms, entitled "SYSTEM AND METHOD FOR CONTENT SHARING," the complete disclosure of which is expressly incorporated herein by reference for all purposes, provides additional details on CPE in the form of a converged premises gateway device. Related aspects are also disclosed in US Patent Publication 2007-0217436 of Markley et al, entitled "METHODS AND APPARATUS FOR CENTRALIZED CONTENT AND DATA DELIVERY," the complete disclosure of which is expressly incorporated herein by reference for all purposes.

Figure 5:
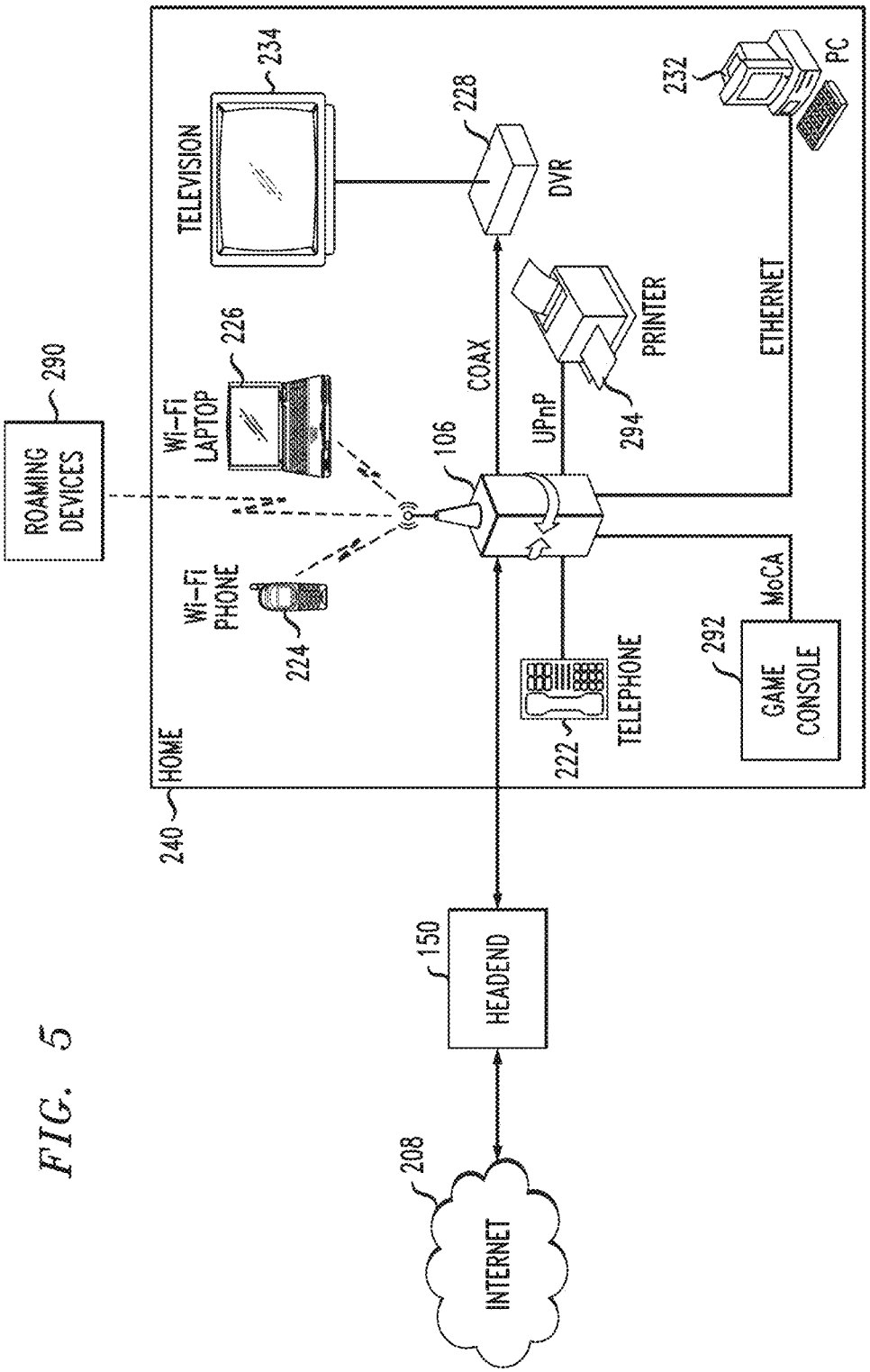
FIG. 5 is a functional block diagram of a premises network, including an exemplary centralized customer premises equipment (CPE) unit, interfacing with a head end such as that of FIG. 3.
Figure 6:
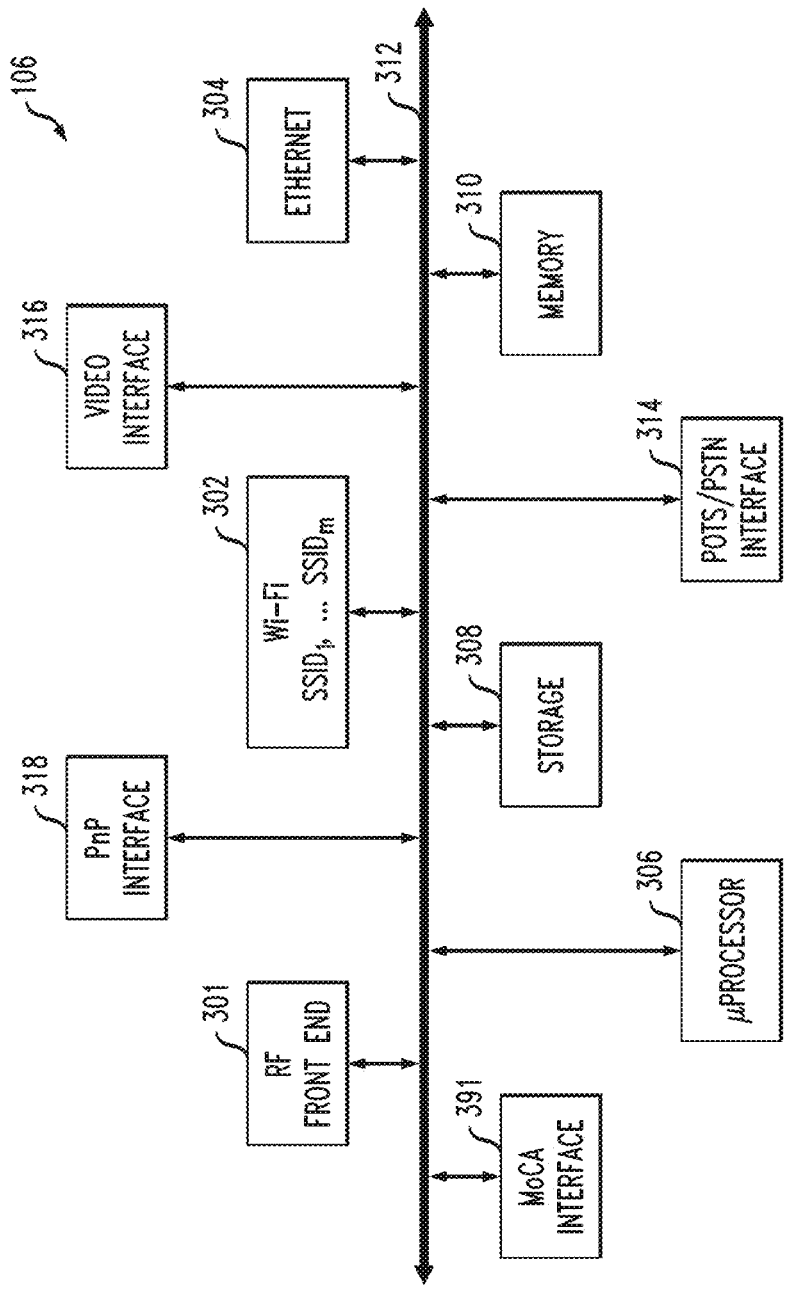
FIG. 6 is a functional block diagram of an exemplary centralized CPE unit, useful within the system of FIG. 1.

Reference should now be had to FIG. 5, which presents a block diagram of a premises network interfacing with a head end of an MSO or the like, providing Internet access. An exemplary advanced wireless gateway comprising CPE 106 is depicted as well. It is to be emphasized that the specific form of CPE 106 shown in FIGS. 5 and 6 is exemplary and non-limiting, and shows a number of optional features. Many other types of CPE can be employed in one or more embodiments; for example, a cable modem, DSL modem, and the like. The CPE can also be a Service Optical Network Unit (S-ONU) for FTTH deployment—see FIGS. 8 and 9 and accompanying text.

CPE 106 includes an advanced wireless gateway which connects to a head end 150 or other hub of a network, such as a video content network of an MSO or the like. The head end is coupled also to an internet (e.g., the Internet) 208 which is located external to the head end 150, such as via an Internet (IP) backbone or gateway (not shown).

The head end is in the illustrated embodiment coupled to multiple households or other premises, including the exemplary illustrated household 240. In particular, the head end (for example, a cable modem termination system 156 thereof) is coupled via the aforementioned HFC network and local coaxial cable or fiber drop to the premises, including the consumer premises equipment (CPE) 106. The exemplary CPE 106 is in signal communication with any number of different devices including, e.g., a wired telephony unit 222, a Wi-Fi or other wireless-enabled phone 224, a Wi-Fi or other wireless-enabled laptop 226, a session initiation protocol (SIP) phone, an H.323 terminal or gateway, etc. Additionally, the CPE 106 is also coupled to a digital video recorder (DVR) 228 (e.g., over coax), in turn coupled to television 234 via a wired or wireless interface (e.g., cabling, PAN or 802.15 UWB micro-net, etc.). CPE 106 is also in communication with a network (here, an Ethernet network compliant with IEEE Std. 802.3, although any number of other network protocols and topologies could be used) on which is a personal computer (PC) 232.

Other non-limiting exemplary devices that CPE 106 may communicate with include a printer 294; for example over a universal plug and play (UPnP) interface, and/or a game console 292; for example, over a multimedia over coax alliance (MoCA) interface.

In some instances, CPE 106 is also in signal communication with one or more roaming devices, generally represented by block 290.

A "home LAN" (HLAN) is created in the exemplary embodiment, which may include for example the network formed over the installed coaxial cabling in the premises, the Wi-Fi network, and so forth.

During operation, the CPE 106 exchanges signals with the head end over the interposed coax (and/or other, e.g., fiber) bearer medium. The signals include e.g., Internet traffic (IPv4 or IPv6), digital programming and other digital signaling or content such as digital (packet-based; e.g., VoIP) telephone service. The CPE 106 then exchanges this digital information after demodulation and any decryption (and any demultiplexing) to the particular system(s) to which it is directed or addressed. For example, in one embodiment, a MAC address or IP address can be used as the basis of directing traffic within the client-side environment 240.

Any number of different data flows may occur within the network depicted in FIG. 5. For example, the CPE 106 may exchange digital telephone signals from the head end which are further exchanged with the telephone unit 222, the Wi-Fi phone 224, or one or more roaming devices 290. The digital telephone signals may be IP-based such as Voice-over-IP (VoIP), or may utilize another protocol or transport mechanism. The well-known session initiation protocol (SIP) may be used, for example, in the context of a "SIP phone" for making multi-media calls. The network may also interface with a cellular or other wireless system, such as for example a 3G IMS (IP multimedia subsystem) system, in order to provide multimedia calls between a user or consumer in the household domain 240 (e.g., using a SIP phone or H.323 terminal) and a mobile 3G telephone or personal media device (PMD) user via that user's radio access network (RAN).

The CPE 106 may also exchange Internet traffic (e.g., TCP/IP and other packets) with the head end 150 which is further exchanged with the Wi-Fi laptop 226, the PC 232, one or more roaming devices 290, or other device. CPE 106 may also receive digital programming that is forwarded to the DVR 228 or to the television 234. Programming requests and other control information may be received by the CPE 106 and forwarded to the head end as well for appropriate handling.

FIG. 6 is a block diagram of one exemplary embodiment of the CPE 106 of FIG. 5. The exemplary CPE 106 includes an RF front end 301, Wi-Fi interface 302, video interface 316, "Plug n' Play" (PnP) interface 318 (for example, a UPnP interface) and Ethernet interface 304, each directly or indirectly coupled to a bus 312. In some cases, Wi-Fi interface 302 comprises a single wireless access point (WAP) running multiple ("m") service set identifiers (SSIDs). In some cases, multiple SSIDs, which could represent different applications, are served from a common WAP. For example, SSID 1 is for the home user, while SSID 2 may be for a managed security service, SSID 3 may be a managed home networking service, SSID 4 may be a hot spot, and so on. Each of these is on a separate IP subnetwork for security, accounting, and policy reasons. The microprocessor 306, storage unit 308, plain old telephone service (POTS)/public switched telephone network (PSTN) interface 314, and memory unit 310 are also coupled to the exemplary bus 312, as is a suitable MoCA interface 391. The memory unit 310 typically comprises a random access memory (RAM) and storage unit 308 typically comprises a hard disk drive, an optical drive (e.g., CD-ROM or DVD), NAND flash memory, RAID (redundant array of inexpensive disks) configuration, or some combination thereof.

The illustrated CPE 106 can assume literally any discrete form factor, including those adapted for desktop, floor-standing, or wall-mounted use, or alternatively may be integrated in whole or part (e.g., on a common functional basis) with other devices if desired.

Again, it is to be emphasized that every embodiment need not necessarily have all the elements shown in FIG. 6—as noted, the specific form of CPE 106 shown in FIGS. 5 and 6 is exemplary and non-limiting, and shows a number of optional features. Yet again, many other types of CPE can be employed in one or more embodiments; for example, a cable modem, DSL modem, and the like.

It will be recognized that while a linear or centralized bus architecture is shown as the basis of the exemplary embodiment of FIG. 6, other bus architectures and topologies may be used. For example, a distributed or multi-stage bus architecture may be employed. Similarly, a "fabric" or other mechanism (e.g., crossbar switch, RAPIDIO interface, non-blocking matrix, TDMA or multiplexed system, etc.) may be used as the basis of at least some of the internal bus communications within the device. Furthermore, many if not all of the foregoing functions may be integrated into one or more integrated circuit (IC) devices in the form of an ASIC or "system-on-a-chip" (SoC). Myriad other architectures well known to those in the data processing and computer arts may accordingly be employed.

Yet again, it will also be recognized that the CPE configuration shown is essentially for illustrative purposes, and various other configurations of the CPE 106 are consistent with other embodiments of the invention. For example, the CPE 106 in FIG. 6 may not include all of the elements shown, and/or may include additional elements and interfaces such as for example an interface for the HomePlug A/V standard which transmits digital data over power lines, a PAN (e.g., 802.15), Bluetooth, or other short-range wireless interface for localized data communication, etc.

A suitable number of standard 10/100/1000 Base T Ethernet ports for the purpose of a Home LAN connection are provided in the exemplary device of FIG. 6; however, it will be appreciated that other rates (e.g., Gigabit Ethernet or 10-Gig-E) and local networking protocols (e.g., MoCA, USB, etc.) may be used. These interfaces may be serviced via a WLAN interface, wired RJ-45 ports, or otherwise. The CPE 106 can also include a plurality of RJ-11 ports for telephony interface, as well as a plurality of USB (e.g., USB 2.0) ports, and IEEE-1394 (Firewire) ports. S-video and other signal interfaces may also be provided if desired.

During operation of the CPE 106, software located in the storage unit 308 is run on the microprocessor 306 using the memory unit 310 (e.g., a program memory within or external to the microprocessor). The software controls the operation of the other components of the system, and provides various other functions within the CPE. Other system software/firmware may also be externally reprogrammed, such as using a download and reprogramming of the contents of the flash memory, replacement of files on the storage device or within other non-volatile storage, etc. This allows for remote reprogramming or reconfiguration of the CPE 106 by the MSO or other network agent.

It should be noted that some embodiments provide a cloud-based user interface, wherein CPE 106 accesses a user interface on a server in the cloud, such as in NDC 1098.

The RF front end 301 of the exemplary embodiment comprises a cable modem of the type known in the art. In some cases, the CPE just includes the cable modem and omits the optional features. Content or data normally streamed over the cable modem can be received and distributed by the CPE 106, such as for example packetized video (e.g., IPTV). The digital data exchanged using RF front end 301 includes IP or other packetized protocol traffic that provides access to internet service. As is well known in cable modem technology, such data may be streamed over one or more dedicated QAMs resident on the HFC bearer medium, or even multiplexed or otherwise combined with QAMs allocated for content delivery, etc. The packetized (e.g., IP) traffic received by the CPE 106 may then be exchanged with other digital systems in the local environment 240 (or outside this environment by way of a gateway or portal) via, e.g. the Wi-Fi interface 302, Ethernet interface 304 or plug-and-play (PnP) interface 318.

Additionally, the RF front end 301 modulates, encrypts/multiplexes as required, and transmits digital information for receipt by upstream entities such as the CMTS or a network server. Digital data transmitted via the RF front end 301 may include, for example, MPEG-2 encoded programming data that is forwarded to a television monitor via the video interface 316. Programming data may also be stored on the CPE storage unit 308 for later distribution by way of the video interface 316, or using the Wi-Fi interface 302, Ethernet interface 304, Firewire (IEEE Std. 1394), USB/USB2, or any number of other such options.

Other devices such as portable music players (e.g., MP3 audio players) may be coupled to the CPE 106 via any number of different interfaces, and music and other media files downloaded for portable use and viewing.

In some instances, the CPE 106 includes a DOCSIS cable modem for delivery of traditional broadband Internet services. This connection can be shared by all Internet devices in the premises 240; e.g. Internet protocol television (IPTV) devices, PCs, laptops, etc., as well as by roaming devices 290. In addition, the CPE 106 can be remotely managed (such as from the head end 150, or another remote network agent) to support appropriate IP services. Some embodiments could utilize a cloud-based user interface, wherein CPE 106 accesses a user interface on a server in the cloud, such as in NDC 1098.

In some instances the CPE 106 also creates a home Local Area Network (LAN) utilizing the existing coaxial cable in the home. For example, an Ethernet-over-coax based technology allows services to be delivered to other devices in the home utilizing a frequency outside (e.g., above) the traditional cable service delivery frequencies. For example, frequencies on the order of 1150 MHz could be used to deliver data and applications to other devices in the home such as PCs, PMDs, media extenders and set-top boxes. The coaxial network is merely the bearer; devices on the network utilize Ethernet or other comparable networking protocols over this bearer.

The exemplary CPE 106 shown in FIGS. 5 and 6 acts as a Wi-Fi access point (AP), thereby allowing Wi-Fi enabled devices to connect to the home network and access Internet, media, and other resources on the network. This functionality can be omitted in one or more embodiments.

In one embodiment, Wi-Fi interface 302 comprises a single wireless access point (WAP) running multiple ("m") service set identifiers (SSIDs). One or more SSIDs can be set aside for the home network while one or more SSIDs can be set aside for roaming devices 290.

A premises gateway software management package (application) is also provided to control, configure, monitor and provision the CPE 106 from the cable head-end 150 or other remote network node via the cable modem (DOCSIS) interface. This control allows a remote user to configure and monitor the CPE 106 and home network. Yet again, it should be noted that some embodiments could employ a cloud-based user interface, wherein CPE 106 accesses a user interface on a server in the cloud, such as in NDC 1098. The MoCA interface 391 can be configured, for example, in accordance with the MoCA 1.0, 1.1, or 2.0 specifications.

As discussed above, the optional Wi-Fi wireless interface 302 is, in some instances, also configured to provide a plurality of unique service set identifiers (SSIDs) simultaneously. These SSIDs are configurable (locally or remotely), such as via a web page.

Figure 8:
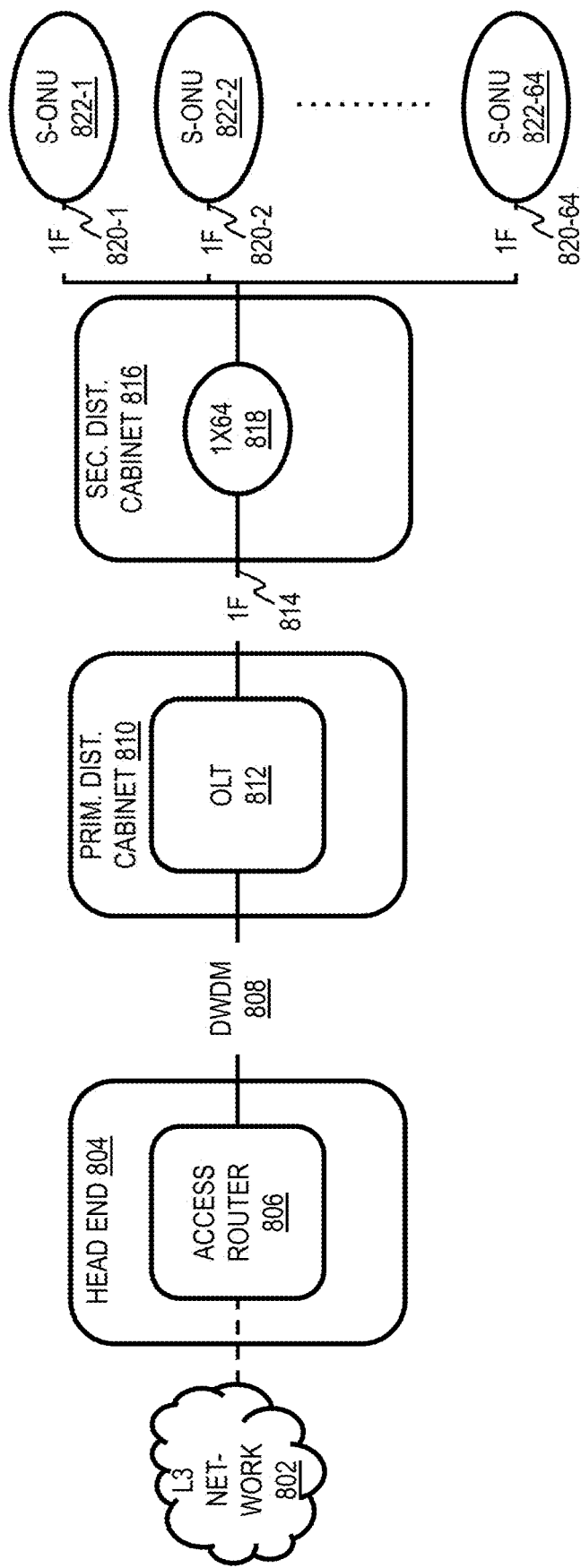
FIG. 8 is a functional block diagram illustrating an exemplary FTTH system, which is one exemplary system within which one or more embodiments could be employed.

As noted, there are also fiber networks for fiber to the home (FTTH) deployments (also known as fiber to the premises or FTTP), where the CPE is a Service ONU (S-ONU; ONU=optical network unit). Referring now to FIG. 8, L3 network 802 generally represents the elements in FIG. 1 upstream of the head ends 150, while head end 804, including access router 806, is an alternative form of head end that can be used in lieu of or in addition to head ends 150 in one or more embodiments. Head end 804 is suitable for FTTH implementations. Access router 806 of head end 804 is coupled to optical line terminal 812 in primary distribution cabinet 810 via dense wavelength division multiplexing (DWDM) network 808. Single fiber coupling 814 is then provided to a 1:64 splitter 818 in secondary distribution cabinet 816 which provides a 64:1 expansion to sixty-four S-ONUs 822-1 through 822-64 (in multiple premises) via sixty-four single fibers 820-1 through 820-64, it being understood that a different ratio splitter could be used in other embodiments and/or that not all of the 64 (or other number of) outlet ports are necessarily connected to an S-ONU.

Figure 9:
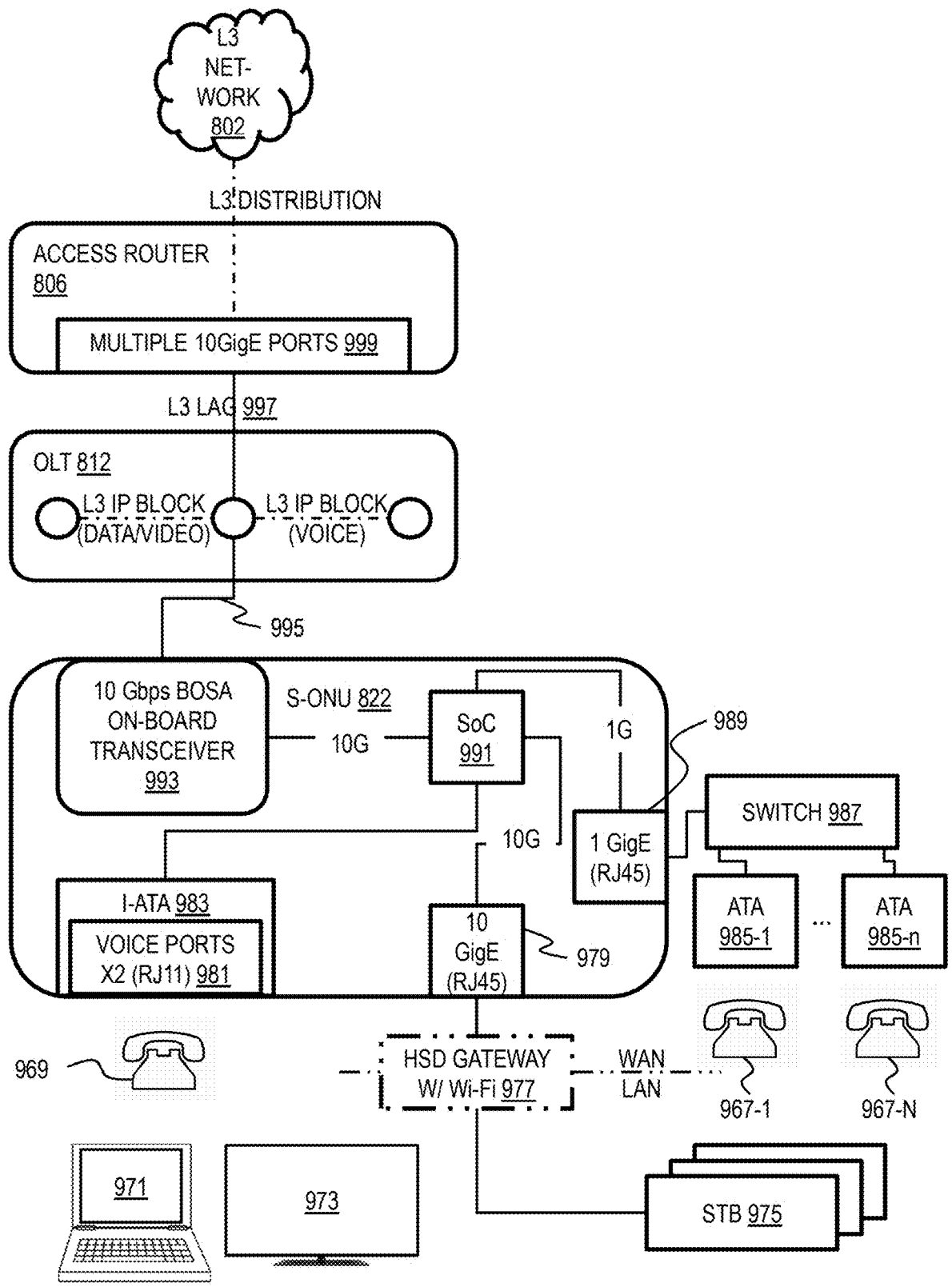
FIG. 9 is a functional block diagram of an exemplary centralized S-ONU CPE unit interfacing with the system of FIG. 8.

Giving attention now to FIG. 9, wherein elements similar to those in FIG. 8 have been given the same reference number, access router 806 is provided with multiple ten-Gigabit Ethernet ports 999 and is coupled to OLT 812 via L3 (layer 3) link aggregation group (LAG) 997. OLT 812 can include an L3 IP block for data and video, and another L3 IP block for voice, for example. In a non-limiting example, S-ONU 822 includes a 10 Gbps bi-directional optical subassembly (BOSA) on-board transceiver 993 with a 10G connection to system-on-chip (SoC) 991. SoC 991 is coupled to a 10 Gigabit Ethernet RJ45 port 979, to which a high-speed data gateway 977 with Wi-Fi capability is connected via category 5E cable. Gateway 977 is coupled to one or more set-top boxes 975 via category 5e, and effectively serves as a wide area network (WAN) to local area network (LAN) gateway. Wireless and/or wired connections can be provided to devices such as laptops 971, televisions 973, and the like, in a known manner. Appropriate telephonic capability can be provided. In a non-limiting example, residential customers are provided with an internal integrated voice gateway (I-ATA or internal analog telephone adapter) 983 coupled to SoC 991, with two RJ11 voice ports 981 to which up to two analog telephones 969 can be connected. Furthermore, in a non-limiting example, business customers are further provided with a 1 Gigabit Ethernet RJ45 port 989 coupled to SoC 991, to which switch 987 is coupled via Category 5e cable. Switch 987 provides connectivity for a desired number n (typically more than two) of analog telephones 967-1 through 967-n, suitable for the needs of the business, via external analog telephone adapters (ATAs) 985-1 through 985-n. The parameter "n" in FIG. 9 is not necessarily the same as the parameter "n" in other figures, but rather generally represents a desired number of units. Connection 995 can be, for example, via SMF (single-mode optical fiber).

In addition to "broadcast" content (e.g., video programming), the systems of FIGS. 1-6, 8, and 9 also deliver Internet data services using the Internet protocol (IP), although other protocols and transport mechanisms of the type well known in the digital communication art may be substituted. In the systems of FIGS. 1-6, the IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

Figure 10A:
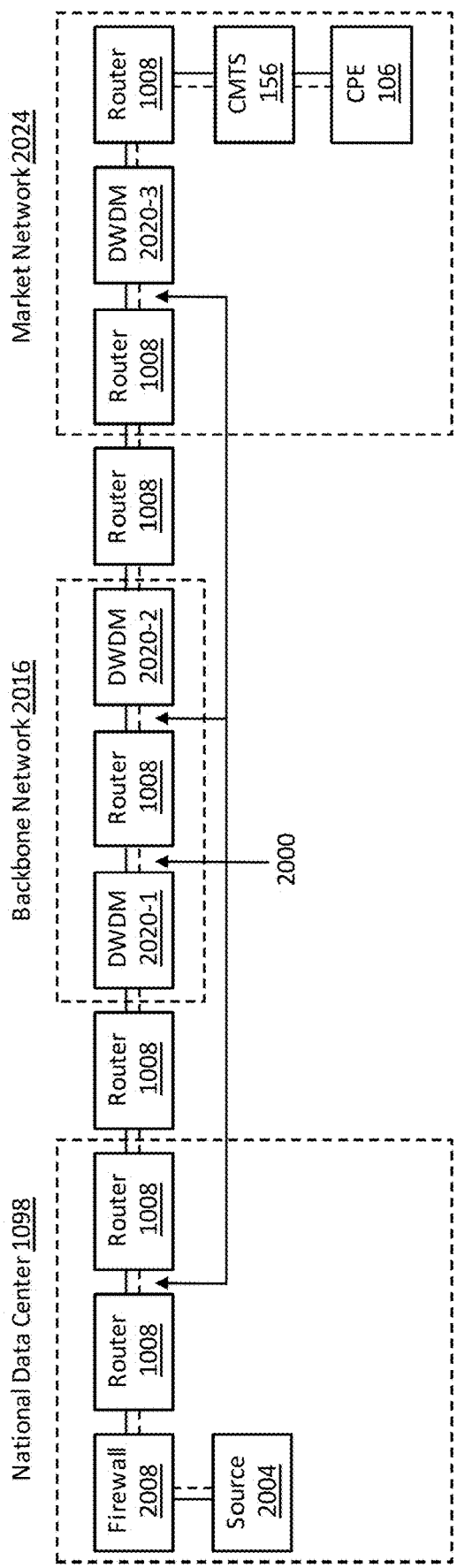
FIG. 10A is a dataflow diagram for an end-to-end (source to destination) packet flow, in accordance with an example embodiment.

FIG. 10A is a dataflow diagram for an end-to-end (source to destination) packet flow 2000, in accordance with an example embodiment. In one example embodiment, the packet flow 2000 is for a video-on-demand application. The packet flow 2000 begins at a source 2004, such as a video server 1052 in a national data center 1098. The packet flow 2000 passes through a firewall 2008 and one or more routers 1008 within the national data center 1098. In addition, the packet flow 2000 may pass through a router 1008 residing between the national data center 1098 and a backbone network 2016.

In one example embodiment, the backbone network 2016 transports the packet flow 2000 via one or more optical dense wavelength-division multiplexing nodes 2020-1, 2020-2 . . . 2020-3 (collectively known as DWDM nodes 2020 herein; in general, there can be N integer number of such nodes with the highest numbered node referred to as 2020-N) and one or more routers 1008. In addition, the packet flow 2000 may pass through a router 1008 residing between the backbone network 2016 and a market network 2024. The market network 2024 transports the packet flow 2000 via one or more routers 1008, one or more DWDM nodes 2020, and a cable modem termination system 156 to CPE 106 (the destination of the video-on-demand application).

Figure 10B:
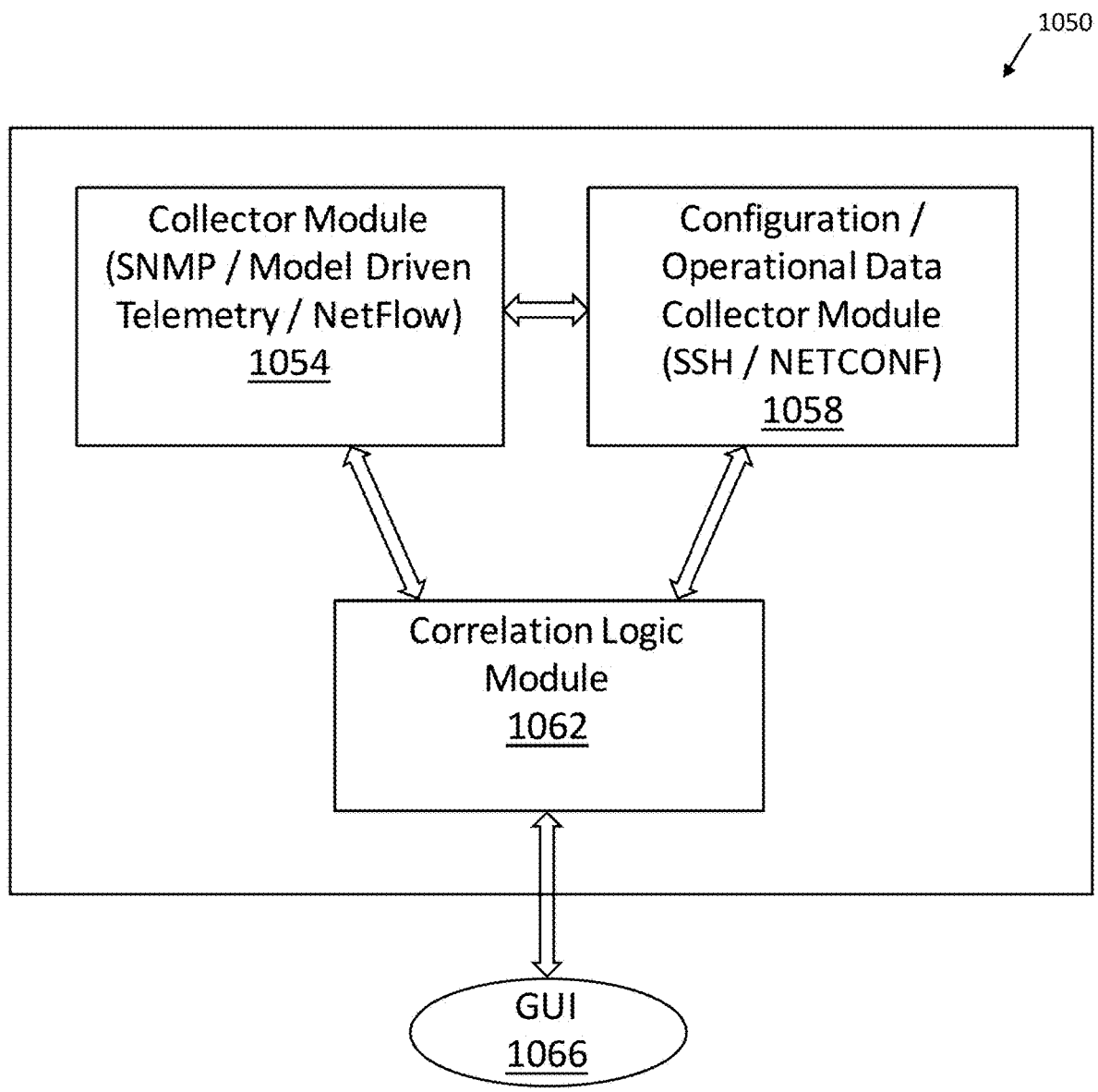
FIG. 10B is a block diagram of a system for end-to-end (source to destination) packet flow analysis, in accordance with an example embodiment.

FIG. 10B is a block diagram of a system 1050 for end-to-end (source to destination) packet flow analysis, in accordance with an example embodiment. A collector module 1054 and a configuration/operational data (COD) collector module 1058 collect status, configuration, and operational information from various devices throughout the system 1050, such as source 2004, video server 1052, firewall 2008, routers 1008, DWDM nodes 2020, cable modem termination system 156, and CPE 106. A correlation logic module 1062 correlates each end-to-end packet flow 2000 across the multi-domains of the system of FIG. 10A (including the national data center 1098, the backbone network 2016, and the market network 2024) and multi-layers of the various devices of the system of FIG. 10A. A graphical user interface (GUI) module 1066 generates a user interface for viewing and analyzing the status, configuration, and operational information of the system, as described more fully below in conjunction with FIGS. 11A-11C.

Figure 11A:
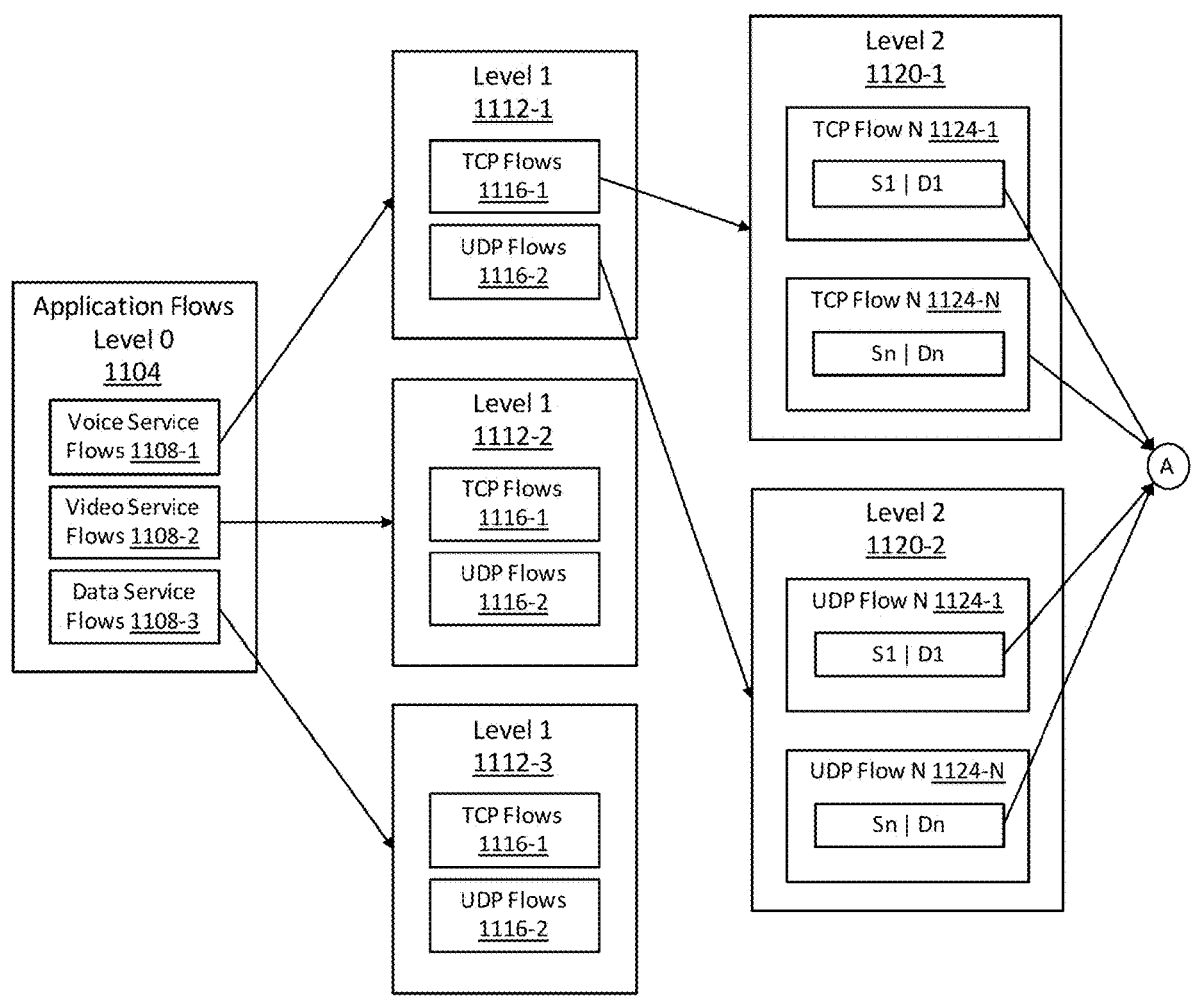
Figure 11B:
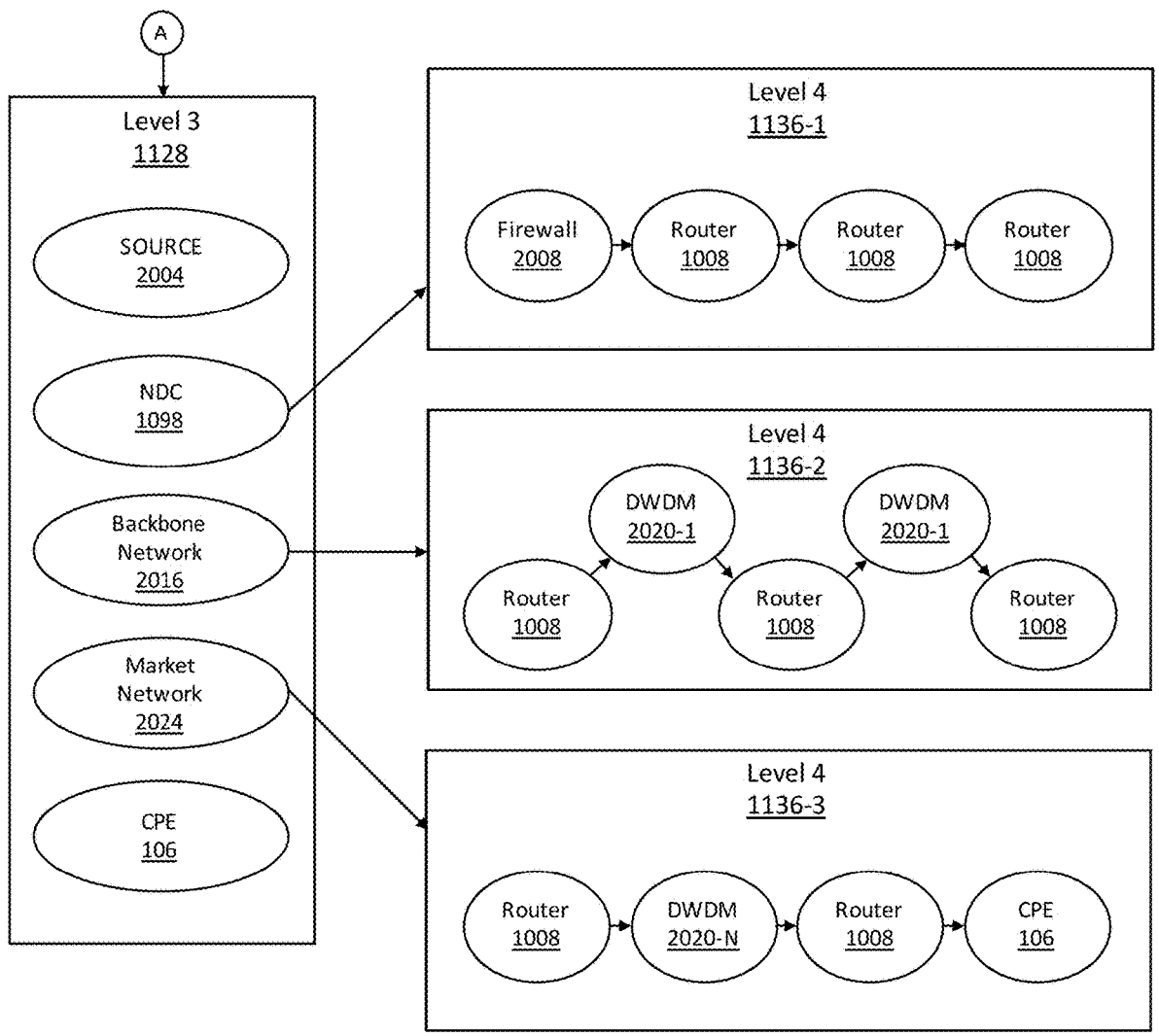

FIGS. 11A-11C are an illustration of the relationship between different windows of an example graphical user interface for displaying status and configuration information for an end-to-end application and/or service over multiple layers of multiple domains of a system, in accordance with an example embodiment. In one example embodiment, the graphical user interface is generated by the GUI module 1066. In one example embodiment, the layers are based on the seven layers of the ISO-OSI (International Organization of Standardization's Open System Interconnect) model. In one example embodiment, the domains are based on the domains of the system 1000 of a cable multi-service operator (MSO), as described more fully above in conjunction with FIGS. 1-10. A top level (level 0) GUI view 1104 displays different types of application and service flows that may be selected by a user for further analysis. The types of application and service flows include, but are not limited to, voice service flows 1108-1, video service flows 1108-2, and data service flows 1108-3 (known collectively as service flows 1108 herein). In one example embodiment, level 0 corresponds to ISO-OSI layer 7 (the application layer).

Selecting one of the service flows 1108 will trigger display of a corresponding level 1 GUI view 1112-1, 1112-2 . . . 1112-3 (known collectively as level 1 GUI views 1112 herein). Each level 1 GUI view 1112 displays the network flows associated with the corresponding service flow 1108. For example, all three service flows 1108 utilize TCP flows and user datagram protocol (UDP) flows. (Other types of network flows are possible.) In one example embodiment, level 1 corresponds to ISO-OSI layer 4 (the transport layer).

Selecting one of the TCP flows or UDP flows 1116-1 . . . 1116-2 (known collectively as network flows 1116 herein) will trigger display of a corresponding level 2 GUI view 1120-1 . . . 1120-2 (known collectively as level 2 GUI views 1120 herein); in one or more embodiments, depicted flows 1120-1, 1120-2 may be a subset of, for example, six total such flows. Each level 2 GUI view 1120 displays the flow information associated with the corresponding network flow 1116. For example, details of the flows, such as the source IP address and destination IP address, are displayed. (Other types of information are possible.) In one example embodiment, level 2 corresponds to ISO-OSI layer 3 (the network layer).

Selecting one of the flows 1124-1 . . . 1124-N of the level 2 GUI view 1120 will trigger display of a corresponding level 3 GUI view 1128 (see FIG. 11B). The level 3 GUI view 1128 displays icons representing the endpoints and domains of FIGS. 11A-11B that are transporting the packet flow 2000. Domains include, but are not limited to, the national data center 1098, the backbone network 2016, and the market network 2024. (Other domains are possible.) Note also source 2004 and CPE 106. In one example embodiment, the domains are defined in a hierarchical manner. For example, multiple market networks 2024 may reside in different geographical areas. In this case, a plurality of level 3 GUI views 1128 may be defined, each level 3 GUI view 1128 representing one or more of the market networks 2024. In addition, multiple market networks 2024 may be represented by a single icon in the level 3 GUI view 1128.

Selecting one of the icons of the level 3 GUI view 1128 will trigger display of a corresponding level 4 GUI view 1136-1, 1136-2 . . . 1136-3 (known collectively as level 4 GUI views 1136 herein). Each level 4 GUI view 1136 displays icons representing the network components of FIG. 11 that are transporting the packet flow 2000 through the corresponding domain. (Other types of network components are possible.) In one example embodiment, level 4 corresponds to one or more of ISO-OSI layers 1-4 and 7 (the physical layer, the data link layer, the network layer, the transport layer, and the application layer, respectively). If multiple market networks 2024 are represented by a single icon in the level 3 GUI view 1128, as described above, the appropriate market network 2024 (that is, the market network 2024 corresponding to the flow 1124-1 . . . 1124-N that was previously selected) will be displayed.

Selecting one of the network component icons of the level 4 GUI view 1136 will trigger display of a corresponding level 5 GUI view 1144-1 . . . 1144-2 (known collectively as level 5 GUI views 1144 herein). Each level 5 GUI view 1144 displays, for example, logs obtained from the routers 1008, and corresponds to one or more of ISO-OSI layers 1-4. In one example embodiment, each level 5 GUI view 1144 displays data-link layer status and/or configuration information and corresponds to ISO-OSI layer 2 (the data link layer).

Selecting one of the data-link icons of the level 5 GUI view 1144 will trigger display of a corresponding level 6 GUI view (not shown). Each level 6 GUI view displays icons (known collectively as physical component icons herein) representing physical (communication) components (such as hardware link interfaces, hardware equipment, cabling, and the like) of the network components of FIG. 11 that are transporting the packet flow 2000. In one example embodiment, level 6 corresponds to ISO-OSI layer 1 (the physical layer).

Selecting one of the physical component icons of the level 6 GUI view will trigger display of a corresponding level 7 GUI view (not shown). Each level 7 GUI view displays status and configuration information for the physical (communication) components of the network components of FIG. 11.

Figure 12:
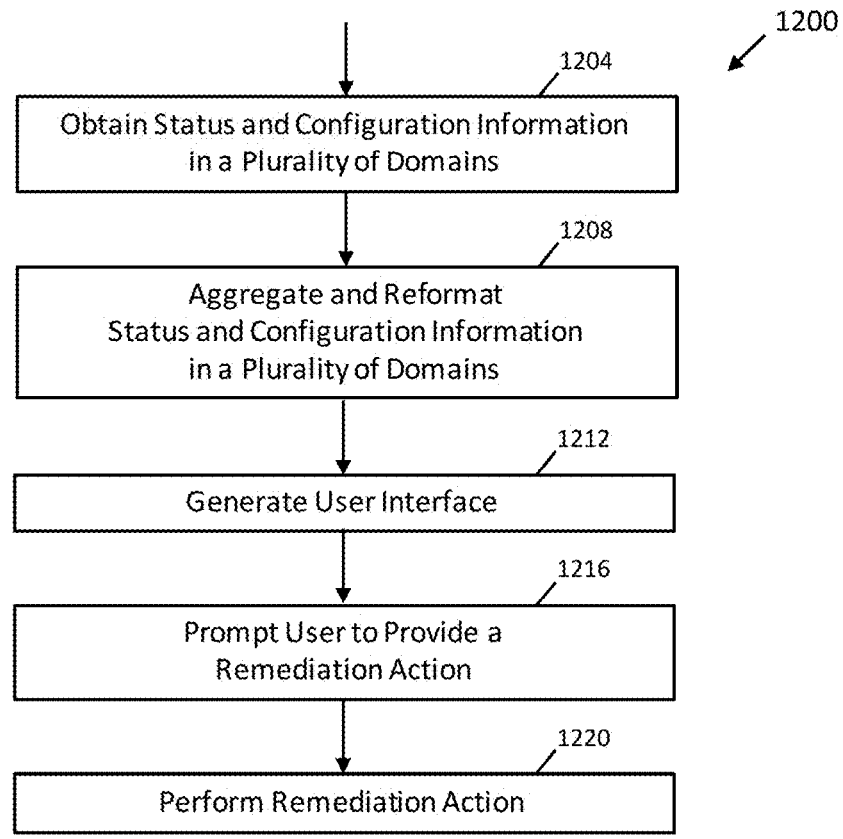
FIG. 12 is a flowchart of an example method for correlating and reformatting status and configuration information from a plurality of components residing in a plurality of domains and generating a user interface for visualizing the correlated and reformatted status and configuration information across the plurality of domains, in accordance with an example embodiment.

FIG. 12 is a flowchart of an example method 1200 for correlating and reformatting status and configuration information from a plurality of components residing in a plurality of domains and generating a user interface for visualizing the correlated and reformatted status and configuration information across the plurality of domains, in accordance with an example embodiment. In one example embodiment, the status and configuration information corresponds to a plurality of layers in a communication model. In one example embodiment, the status and configuration information is obtained from a plurality of components residing in a plurality of domains, the status and configuration information corresponding to the plurality of layers in the communication model (operation 1204). The status and configuration information is correlated and reformatted to create an end-to-end view of a network-based application and/or service (operation 1208). A user interface configured to visualize the correlated and reformatted status and configuration information across the plurality of domains is generated; the user interface is configured to present the visualized status and configuration information at each of the plurality of layers (operation 1212).

For example, consider a failure occurring with an end-to-end video service where the CPE 106 tunes to (joins) a selected video channel. The video is provided via a protocol-independent multicast (PIM) from a video source in, for example, a regional data center 1048 or national data center 1098. Initially, a request to join the PIM is submitted by the CPE 106 via the first hop router 1008 and propagates to the video source. The PIM connection to the CPE 106 and the end-to-end video service are established. During the video session, the packet flow 2000 of the PIM through the system of FIG. 10A can be discovered by, for example, using the source and group information that was used to provision the video service to identify the corresponding packet flow 2000 at each component that is traversed by the video service. The status and configuration information obtained from each component during operation 1204 is correlated to generate a visualization of the end-to-end service through all of the traversed components. The end-to-end visualization is presented during operation 1212. If the video service fails, an administrator selects the video service flows 1108-2 in the top level (level 0) GUI view 1104 and then accesses successive GUI views based on the source and group information to diagnose the failure. If, for example, the entry corresponding to the source and group information shows no upstream interface at a particular router 1008 traversed by the video service, the log for the router 1008 can be accessed and reviewed, and the misconfiguration of the router 1008 that caused the failure can be identified and remedied.

In one example embodiment, the user is prompted to identify a remediation action to perform based on the visualized operational state and configuration information (operation 1216) and the identified remediation action is performed by the system 1050 (operation 1220). For example, the correlation logic module 1062 may reconfigure a route table, may reset a communication link, may route traffic around a failed router 1008, and the like. In one example embodiment, the prompting includes a recommended remediation action, such as a recommendation to reset a specified communication link. In one example embodiment, a remediation action is automatically performed based on the correlated and reformatted operational state and configuration information.

Figure 13:
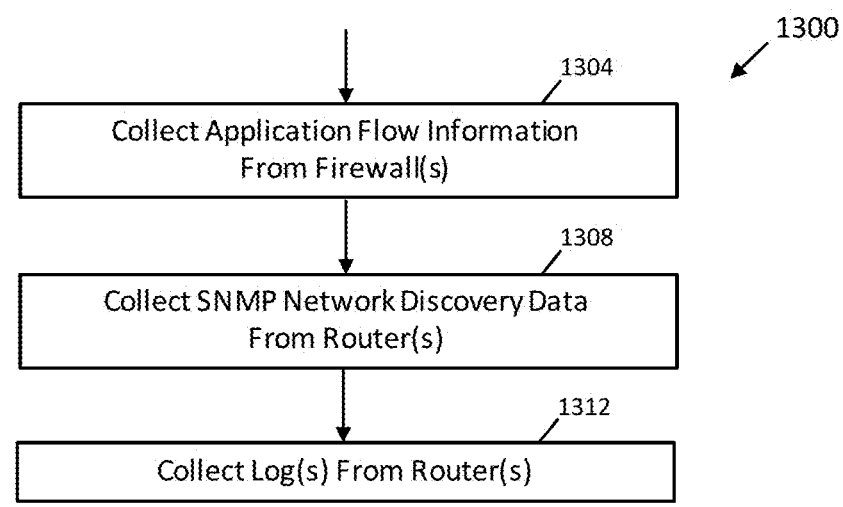
FIG. 13 is a flowchart of an example method for obtaining Simple Network Management Protocol (SNMP)/model-driven telemetry and netflow information, in accordance with an example embodiment.

FIG. 13 is a flowchart of an example method 1300 for obtaining SNMP/model-driven telemetry and netflow information, in accordance with an example embodiment. In one example embodiment, the method 1300 is implemented by the collector module 1054. In one example embodiment, application flow information is collected from the firewalls 2008 (operation 1304). The application flow information is useful, for example, for creating the level 0 GUI view 1104, the level 1 GUI views 1112, and the level 2 GUI views 1120. SNMP network discovery data is collected from the routers 1008 (operation 1308). The SNMP network discovery data is useful, for example, for discovering and providing the multi-domain topology of the system 1000 displayed in the level 3 GUI views 1128 and the level 4 GUI views 1136. Logs are collected from each router 1008 (operation 1312). The logs are useful, for example, for generating the level 5 GUI views 1144.

Figure 14:
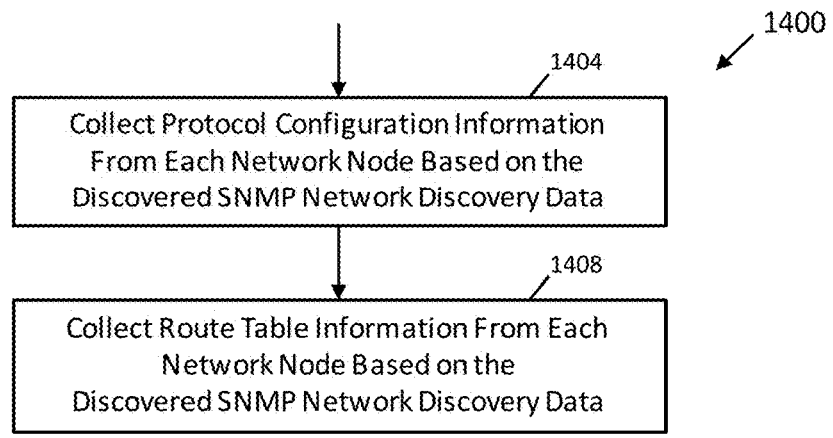
FIG. 14 is a flowchart of an example method for obtaining configuration and operational information, in accordance with an example embodiment.

FIG. 14 is a flowchart of an example method 1400 for obtaining configuration and operational information, in accordance with an example embodiment. In one example embodiment, the method 1400 is implemented by the configuration/operational data (COD) collector module 1058. In one example embodiment, protocol configuration information, such as Interior Gateway Protocol (IGP) and Border Gateway Protocol (BGP) information, is collected from each network node, such as routers 1008, based on the discovered SNMP network discovery data (operation 1404). The routers 1008 may be accessed, for example, using the Secure Shell (SSH)/NETCONF protocols. The protocol configuration information is useful, for example, for generating the level 3 GUI views 1128 and the level 4 GUI views 1136. In one example embodiment, route table information is collected from each network node, such as routers 1008, based on the discovered SNMP network discovery data (operation 1408). The route table information is useful, for example, for generating the level 3 GUI views 1128 and the level 4 GUI views 1136.

Figure 15:
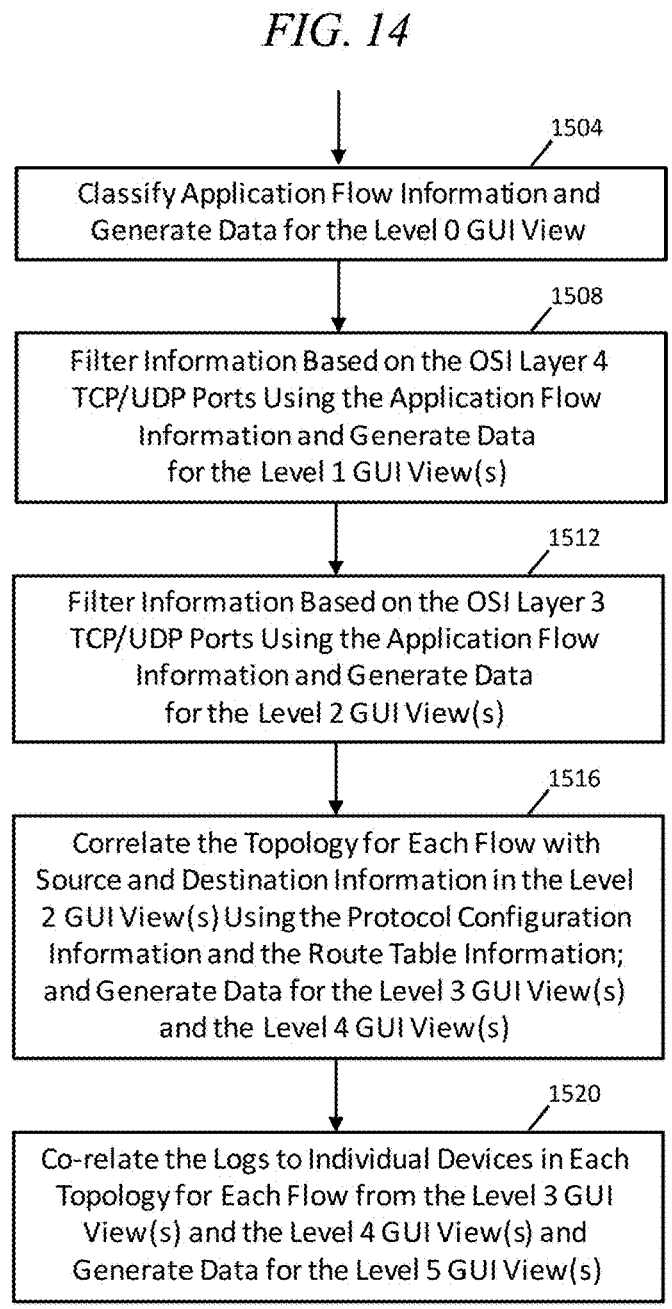
FIG. 15 is a flowchart of an example method for correlating each end-to-end packet flow across the multi-domains of the system and the multi-layers of the various devices of the system, in accordance with an example embodiment.

FIG. 15 is a flowchart of an example method 1500 for correlating each end-to-end packet flow 2000 across the multi-domains of the system 1000 and multi-layers of the various devices of the system 1000, in accordance with an example embodiment. In one example embodiment, the method 1500 is implemented by the correlation logic module 1062. In one example embodiment, the application flow information collected from the firewalls 2008 is classified into one of three buckets (voice, video, and data) based on OSI layer 4 information and the data for the level 0 GUI view 1104 is generated (operation 1504). The application flow information collected from the firewalls 2008 is used to categorize the services based on the OSI layer 4 TCP/UDP ports and the data for the level 1 GUI views 1112 are generated (operation 1508). The application flow information collected from the firewalls 2008 is used to categorize the TCP/UDP flows based on the OSI layer 3 and the level 2 GUI views 1120 are generated (operation 1512). For each flow with source and destination information in the level 2 GUI views 1120, the topology for each flow is correlated using the protocol configuration information and the route table information and the level 3 GUI views 1128 and the level 4 GUI views 1136 are generated (operation 1516). For each flow from the level 3 GUI views 1128 and the level 4 GUI views 1136, the logs collected from each router 1008 are correlated to individual devices in each topology and the level 5 GUI views 1144 are generated (operation 1520).

Recapitulation

Given the discussion thus far, it will be appreciated that, in general terms, an exemplary method, according to an aspect of the invention, includes operations of comprising: obtaining operational state and configuration information from a plurality of components residing in a plurality of domains, the status and configuration information based on a plurality of layers of a communication model (operation 1204); correlating and reformatting the operational state and configuration information to create an end-to-end view of a network-based application (operation 1208); and generating a user interface 1066 configured to visualize the correlated and reformatted operational state and configuration information across the plurality of domains (operation 1212), the user interface 1066 configured to present the visualized status and configuration information at each of the plurality of layers.

In one example embodiment, application flow information is collected from one or more firewalls (operation 1304); SNMP network discovery data is collected from one or more routers 1008 (operation 1308); and one or more logs are collected from each of the one or more routers 1008 (operation 1312). In one example embodiment, protocol configuration information is collected from each network node based on the discovered SNMP network discovery data (operation 1404); and route table information is collected from each network node based on the discovered SNMP network discovery data (operation 1408).

In one example embodiment, the application flow information collected from the one or more firewalls 2008 is classified into one of three buckets based on OSI layer 4 information (operation 1504); and data for a level 0 GUI view 1104 is generated (operation 1504). In one example embodiment, one or more services are categorized based on one or more OSI layer 4 TCP/UDP ports using the application flow information collected from the one or more firewalls (operation 1508); and one or more level 1 GUI views 1112 are generated (operation 1508). In one example embodiment, one or more TCP/UDP flows are categorized based on an OSI layer 3 using the application flow information collected from the one or more firewalls (operation 1512); and one or more level 2 GUI views 1120 are generated (operation 1512). In one example embodiment, for each flow with source 2004 and destination information in the level 2 GUI view 1120s, topology for each flow is correlated using the protocol configuration information and the route table information (operation 1516); and one or more level 3 GUI views 1128 and one or more level 4 GUI views 1136 are generated (operation 1516). In one example embodiment, for each flow from the one or more level 3 GUI views 1128 and the one or more level 4 GUI views 1136, the logs collected from each router 1008 are correlated to individual devices in each topology (operation 1520); and one or more level 5 GUI views 1144 are generated (operation 1520).

In one example embodiment, a user is prompted to identify a remediation action to perform based on the visualized operational state and configuration information (operation 1216); and the identified remediation action is performed (operation 1220). In one example embodiment, the prompting includes a recommended remediation action. In one example embodiment, a remediation action is performed based on the correlated and reformatted operational state and configuration information.

In one aspect, an apparatus comprises a memory; and at least one processor, coupled to said memory, and operative to perform operations comprising: obtaining operational state and configuration information from a plurality of components residing in a plurality of domains, the status and configuration information based on a plurality of layers of a communication model (operation 1204); correlating and reformatting the operational state and configuration information to create an end-to-end view of a network-based application (operation 1208); and generating a user interface 1066 configured to visualize the correlated and reformatted operational state and configuration information across the plurality of domains (operation 1212), the user interface 1066 configured to present the visualized status and configuration information at each of the plurality of layers.

In one aspect, a non-transitory computer readable medium comprises computer executable instructions which when executed by a computer cause the computer to perform operations comprising: obtaining operational state and configuration information from a plurality of components residing in a plurality of domains, the status and configuration information based on a plurality of layers of a communication model (operation 1204); correlating and reformatting the operational state and configuration information to create an end-to-end view of a network-based application (operation 1208); and generating a user interface 1066 configured to visualize the correlated and reformatted operational state and configuration information across the plurality of domains (operation 1212), the user interface 1066 configured to present the visualized status and configuration information at each of the plurality of layers.

System and Article of Manufacture Details

The invention can employ hardware aspects or a combination of hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). The means do not include transmission media per se or disembodied signals per se. Appropriate interconnections via bus, network, and the like can also be included.

Figure 7:
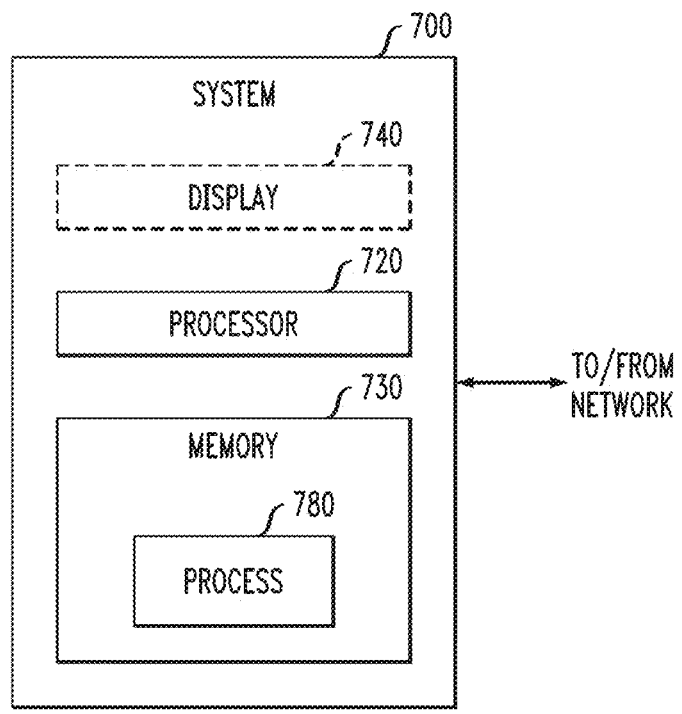
FIG. 7 is a block diagram of a computer system useful in connection with one or more aspects of the invention.

FIG. 7 is a block diagram of a system 700 that can implement at least some aspects of the invention, and is representative, for example, of one or more of the servers shown in the figures. As shown in FIG. 7, memory 730 configures the processor 720 to implement one or more methods, steps, and functions (collectively, shown as process 780 in FIG. 7). The memory 730 could be distributed or local and the processor 720 could be distributed or singular. Different steps could be carried out by different processors.

The memory 730 could be implemented as an electrical, magnetic or optical memory, or any combination of these or other types of storage devices. It should be noted that if distributed processors are employed, each distributed processor that makes up processor 720 generally contains its own addressable memory space. It should also be noted that some or all of computer system 700 can be incorporated into an application-specific or general-use integrated circuit. For example, one or more method steps could be implemented in hardware in an ASIC or via a field-programmable gate array (FPGA) rather than using firmware. Display 740 is representative of a variety of possible input/output devices (e.g., keyboards, mice, and the like). Every processor may not have a display, keyboard, mouse or the like associated with it.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system (including, for example, system 700 or the like), to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass a transmission medium or disembodied signal.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program product comprising computer program code means adapted to perform one or all of the steps of any methods or claims set forth herein when such program is run, for example, on a virtualized or non-virtualized hardware server implementing one or more of the collector module 1054, the configuration/operational data (COD) collector module 1058, the correlation logic module 1062, and the graphical user interface module 1066, and that such program may be embodied on a tangible computer readable recordable storage medium. As used herein, including the claims, unless it is unambiguously apparent from the context that only server software is being referred to, a "server" includes a physical data processing system (for example, system 700 as shown in FIG. 7) running one or more server programs. It will be understood that such a physical server may or may not include a display, keyboard, or other input/output components. Furthermore, as used herein, including the claims, a "router" includes a networking device with both software and hardware tailored to the tasks of routing and forwarding information.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures (e.g. modules/sub-modules to implement the collector module 1054, the configuration/operational data (COD) collector module 1058, the correlation logic module 1062, and the graphical user interface module 1066. The method steps can then be carried out using the distinct software modules of the system, as described above, executing on one or more hardware processors (e.g., a hardware processor or server located in the regional data center 1048 and/or national data center 1098). Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for diagnosing a fault in a system, the method comprising:
   obtaining operational state and configuration information from a plurality of components residing in a plurality of domains, the status and configuration information based on a plurality of layers of a communication model;
   correlating and reformatting the operational state and configuration information to create an end-to-end view of a network-based application;
   categorizing one or more TCP/UDP flows based on an OSI layer 3 using application flow information collected from one or more firewalls;
   generating one or more level 2 graphical user interface (GUI) views based on the categorized one or more TCP/UDP flows;
   correlating, for each flow with source and destination information in the level 2 graphical user interface (GUI) views, topology for each flow using protocol configuration information and route table information;
   generating one or more level 3 graphical user interface (GUI) views and one or more level 4 graphical user interface (GUI) views based on the correlated topology; and
   generating a user interface configured to visualize the correlated and reformatted operational state and configuration information across the plurality of domains, the user interface configured to present the visualized status and configuration information at each of the plurality of layers.

2. The method of claim 1, further comprising:
   collecting the application flow information from the one or more firewalls;
   collecting SNMP network discovery data from one or more routers; and
   collecting one or more logs from each of the one or more routers.

3. The method of claim 2, further comprising:
   collecting the protocol configuration information from each network node based on the discovered SNMP network discovery data; and
   collecting the route table information from each network node based on the discovered SNMP network discovery data.

4. The method of claim 3, further comprising:
   classifying the application flow information collected from the one or more firewalls 2008 into one of three buckets based on OSI layer 4 information; and
   generating data for a level 0 GUI view.

5. The method of claim 3, further comprising:
   categorizing one or more services based on one or more OSI layer 4 TCP/UDP ports using the application flow information collected from the one or more firewalls; and
   generating one or more level 1 GUI views.

6. The method of claim 1, further comprising:
   correlating, for each flow from the one or more level 3 GUI views and the one or more level 4 GUI views, the logs collected from each router to individual devices in each topology; and
   generating one or more level 5 GUI views.

7. The method of claim 1, further comprising:
   prompting a user to identify a remediation action to perform based on the visualized operational state and configuration information; and
   performing the identified remediation action.

8. The method of claim 7, where the prompting includes a recommended remediation action.

9. The method of claim 1, further comprising performing a remediation action based on the correlated and reformatted operational state and configuration information.

10. An apparatus comprising:
a memory; and
at least one processor, coupled to said memory, and operative to perform operations comprising:
obtaining operational state and configuration information from a plurality of components residing in a plurality of domains, the status and configuration information based on a plurality of layers of a communication model;
correlating and reformatting the operational state and configuration information to create an end-to-end view of a network-based application;
categorizing one or more TCP/UDP flows based on an OSI layer 3 using application flow information collected from one or more firewalls;
generating one or more level 2 graphical user interface (GUI) views based on the categorized one or more TCP/UDP flows;
correlating, for each flow with source and destination information in the level 2 graphical user interface (GUI) views, topology for each flow using protocol configuration information and route table information;
generating one or more level 3 graphical user interface (GUI) views and one or more level 4 graphical user interface (GUI) views based on the correlated topology; and
generating a user interface configured to visualize the correlated and reformatted operational state and configuration information across the plurality of domains, the user interface configured to present the visualized status and configuration information at each of the plurality of layers.

11. The apparatus of claim 10, the operations further comprising:
collecting the application flow information from the one or more firewalls;
collecting SNMP network discovery data from one or more routers; and
collecting one or more logs from each of the one or more routers.

12. The apparatus of claim 11, the operations further comprising:
collecting the protocol configuration information from each network node based on the discovered SNMP network discovery data; and
collecting the route table information from each network node based on the discovered SNMP network discovery data.

13. The apparatus of claim 12, the operations further comprising:
classifying the application flow information collected from the one or more firewalls 2008 into one of three buckets based on OSI layer 4 information; and
generating data for a level 0 GUI view.

14. The apparatus of claim 12, the operations further comprising:
categorizing one or more services based on one or more OSI layer 4 TCP/UDP ports using the application flow information collected from the one or more firewalls; and
generating one or more level 1 GUI views.

15. The apparatus of claim 10, the operations further comprising:
prompting a user to identify a remediation action to perform based on the visualized operational state and configuration information; and
performing the identified remediation action.

16. A non-transitory computer readable medium comprising computer executable instructions which when executed by a computer cause the computer to perform operations comprising:
obtaining operational state and configuration information from a plurality of components residing in a plurality of domains, the status and configuration information based on a plurality of layers of a communication model;
correlating and reformatting the operational state and configuration information to create an end-to-end view of a network-based application;
categorizing one or more TCP/UDP flows based on an OSI layer 3 using application flow information collected from one or more firewalls;
generating one or more level 2 graphical user interface (GUI) views based on the categorized one or more TCP/UDP flows;
correlating, for each flow with source and destination information in the level 2 graphical user interface (GUI) views, topology for each flow using protocol configuration information and route table information;
generating one or more level 3 graphical user interface (GUI) views and one or more level 4 graphical user interface (GUI) views based on the correlated topology; and
generating a user interface configured to visualize the correlated and reformatted operational state and configuration information across the plurality of domains, the user interface configured to present the visualized status and configuration information at each of the plurality of layers.

* * * * *